United States Patent
Komiya et al.

(10) Patent No.: US 6,833,853 B2
(45) Date of Patent: Dec. 21, 2004

(54) LIGHT BEAM SCANNING APPARATUS AND IMAGE FORMING APPARATUS

(75) Inventors: Kenichi Komiya, Kawasaki (JP); Koji Tanimoto, Shizuoka-ken (JP); Daisuke Ishikawa, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 23 days.

(21) Appl. No.: 10/305,006

(22) Filed: Nov. 27, 2002

(65) Prior Publication Data

US 2004/0100551 A1 May 27, 2004

(51) Int. Cl.⁷ .......................... G03G 21/14; B41J 2/447
(52) U.S. Cl. ...................................... 347/235; 347/250
(58) Field of Search ................................ 347/235, 250, 347/234, 248; 250/208.1

(56) References Cited

U.S. PATENT DOCUMENTS

| | | | |
|---|---|---|---|
| 5,892,533 A | | 4/1999 | Tanimoto et al. |
| 5,929,891 A | * | 7/1999 | Komiya et al. ............. 347/235 |
| 6,243,123 B1 | | 6/2001 | Tanimoto et al. |
| 6,392,684 B1 | | 5/2002 | Tanimoto et al. |
| 6,411,321 B2 | | 6/2002 | Tanimoto et al. |
| 6,462,855 B1 | * | 10/2002 | Komiya et al. ............. 359/212 |
| 6,509,921 B2 | * | 1/2003 | Komiya et al. ............. 347/235 |
| 6,611,279 B2 | * | 8/2003 | Komiya et al. ............. 347/235 |
| 6,639,620 B2 | * | 10/2003 | Ishikawa et al. ............. 347/235 |
| 6,661,444 B2 | * | 12/2003 | Komiya et al. ............. 347/235 |

FOREIGN PATENT DOCUMENTS

JP          2001-10112 A      1/2001

OTHER PUBLICATIONS

US 6,353,454, 3/2002, Tanimoto et al. (withdrawn)
U.S. Appl. No. 09/816,773, Komiya et al., filed Mar. 26, 2001.
U.S. Appl. No. 09/667,317, Komiya et al., filed Sep. 22, 2000.
U.S. Appl. No. 10/134,488, Komiya et al., filed Apr. 30, 2002.

* cited by examiner

Primary Examiner—Huan Tran
(74) Attorney, Agent, or Firm—Foley & Lardner LLP

(57) ABSTRACT

The timing sensors provided in the light-receiving part of a beam-detecting unit have different lengths in the sub-scanning direction. The beam-passing position sensors provided in the light-receiving part of the beam-detecting unit are longer than the timing sensors, in the sub-scanning direction. The intensity of a light beam is controlled in a reference-pitch measuring routine.

8 Claims, 15 Drawing Sheets

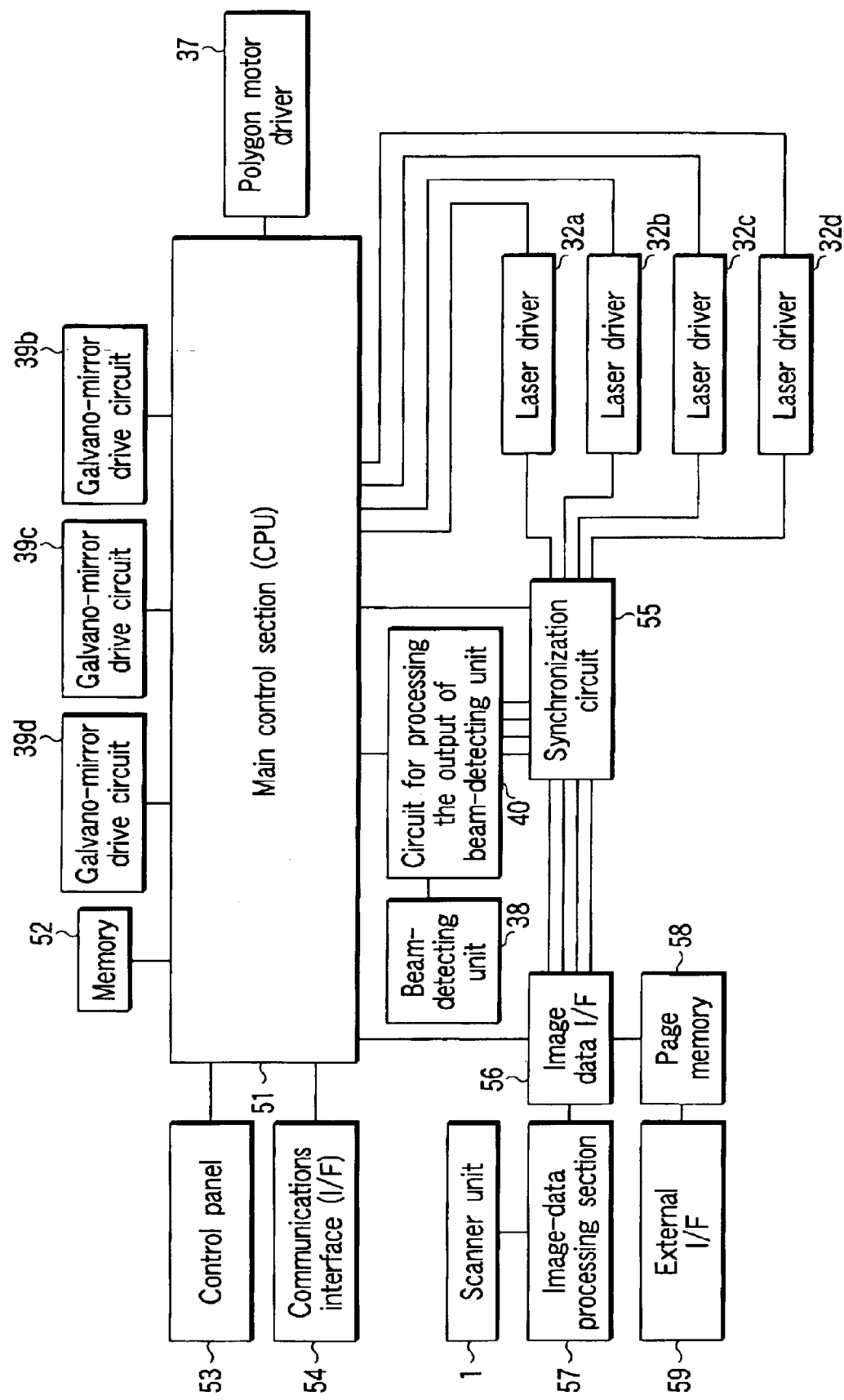
F I G. 3

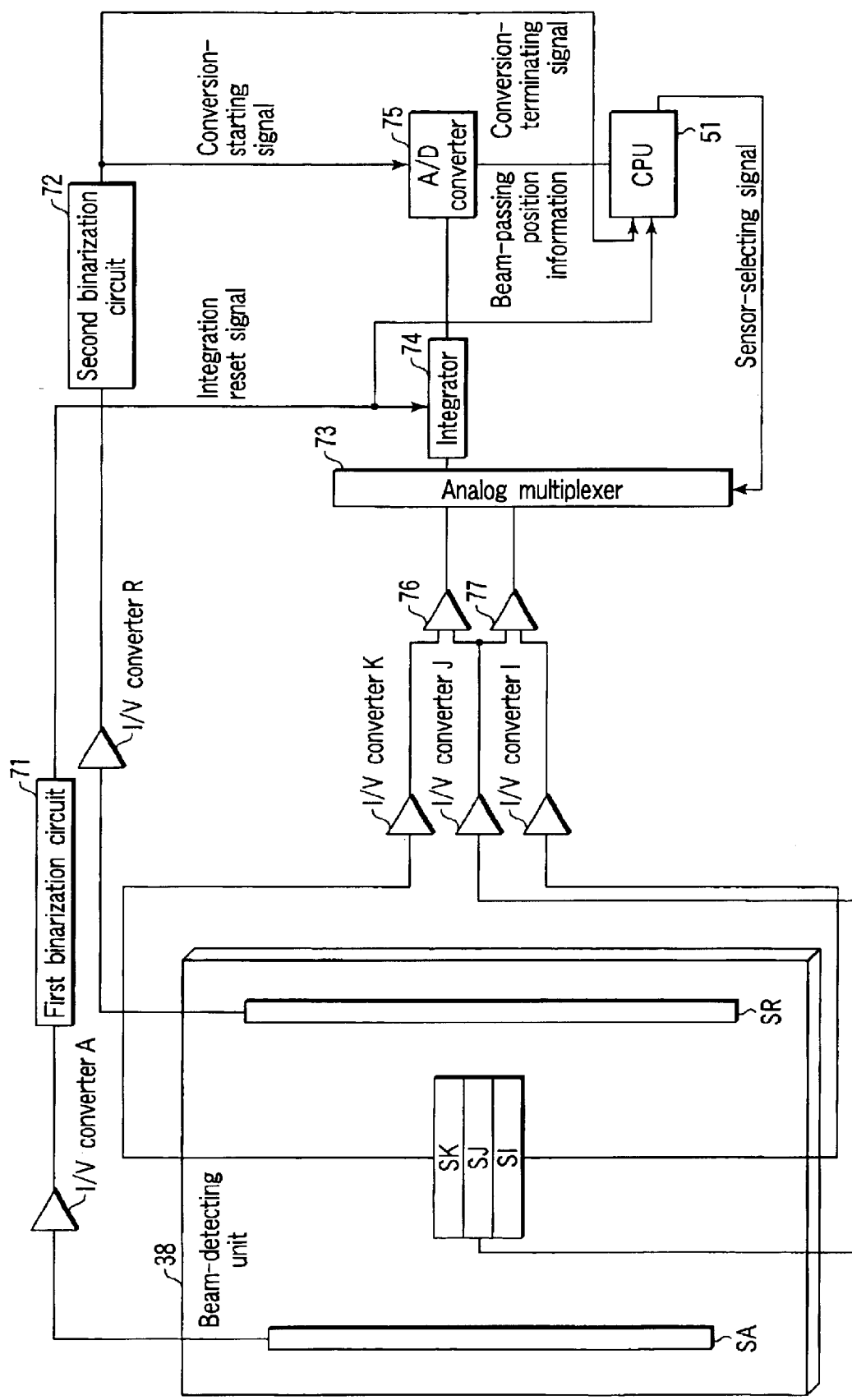
F I G. 5

LIGHT BEAM SCANNING APPARATUS AND IMAGE FORMING APPARATUS

BACKGROUND OF THE INVENTION

The present invention relates to a light-beam scanning apparatus and an image forming apparatus, both for use in digital copy machines, laser printers or the like in which the photosensitive drum is scanned with a laser beam to form a latent image on the photosensitive drum.

To increase the image-forming speed, digital copy machines and the like have been developed, which comprise a light beam scan apparatus of multi-beam type. The light beam scan apparatus generates a plurality of light beams and scans a plurality of lines with these light beams at the same time.

Digital copy machines comprising an optical section such as a light beam scan apparatus are known. In each of the copy machines, the positions of the light beams are controlled in two modes to form high-quality images. First, the positions where the light beams are applied are controlled in the scanning direction (i.e., control of beam positions in the main scanning direction). Second, the positions where the light beams pass are controlled (i.e., control of beam positions in the sub-scanning direction).

In the conventional beam-position sensor, however, two timing sensors that detect the start and end, respectively, are identical in the sub-scanning direction. Therefore, they may malfunction at the boundary between their effective detection region and non-effective detection region. Consequently, the light beams may not be controlled to pass at desired positions. Further, the beam-position sensor cannot have the desired sensitivity, because the components of its beam-detecting section have characteristics different from the design values. (The photodiode has sensitivity different from the designed value, the operational amplifier has an offset-voltage and -resistance different from the design values, and the capacitor has a capacitance difference form the designed value.)

BRIEF SUMMARY OF THE INVENTION

A light beam scanning apparatus according to the invention is designed to scan a surface with a light beam. The apparatus comprises: a light-emitting unit for emitting a light beam; a scanning unit for scanning the surface with the light beam emitted from the light-emitting unit, in a main scanning direction; first beam-detecting unit which is provided on the surface or at a position equivalent to the surface and which converts the light beam to an electric signal at a first position in the main scanning direction; a second beam-detecting unit which is provided on the surface or at a position equivalent to the surface and which converts the light beam to an electric signal at a second position in the main scanning direction, the second position being downstream the first beam-detecting unit; a third beam-detecting unit which is provided on the surface or at a position equivalent to the surface, which has a length different from the first beam-detecting unit in a sub-scanning direction and which converts the light beam to an electric signal at a third position in the main scanning direction, the third position being downstream the second beam-detecting unit; and control unit which reads beam information from the second beam-detecting unit at the time the first and third beam-detecting units detect the light beam and controls a position where the light beam passes or intensity of the light beam.

This invention provides an image forming apparatus that forms an image on an image-forming medium. The apparatus comprises: a light-emitting unit which emits a light beam; an image-carrying body on which a latent image is formed by using the light beam emitted from the light-emitting unit; a scanning unit which scans the surface with the light beam emitted from the light-emitting unit, in a main scanning direction; first beam-detecting unit which is provided on the surface or at a position equivalent to the surface and which converts the light beam to an electric signal at a first position in the main scanning direction; a second beam-detecting unit which is provided on the surface or at a position equivalent to the surface and which converts the light beam to an electric signal at a second position in the main scanning direction, the second position being downstream the first beam-detecting unit; a third beam-detecting unit which is provided on the surface or at a position equivalent to the surface, which has a length different from that of the first beam-scanning unit in a sub-scanning direction and which converts the light beam to an electric signal at a third position in the main scanning direction, the third position being downstream the second beam-detecting unit; control unit which reads beam information from the second beam-detecting unit at the time the first and third beam-detecting units detect the light beam and controls a position where the light beam passes and intensity of the light beam; and an image-forming unit which causes the scanning unit to scan the surface of the image-carrying body with the light beam from the light-emitting unit when the control unit finishes controlling the position and intensity of the light beam, thereby forming an latent image, and which converts the latent image to a visible image and transfers the visible image onto the image-forming medium.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a block diagram depicting the control system used in the digital copying machine;

FIG. 5 is a diagram illustrating the beam-passing position detecting system provided in the first embodiment;

DETAILED DESCRIPTION OF THE INVENTION

Embodiments of the present invention will be described, with reference to the accompanying drawings.

First, an image forming apparatus that can use a light-beam scanning apparatus according to any embodiment will be described.

Figure 1:
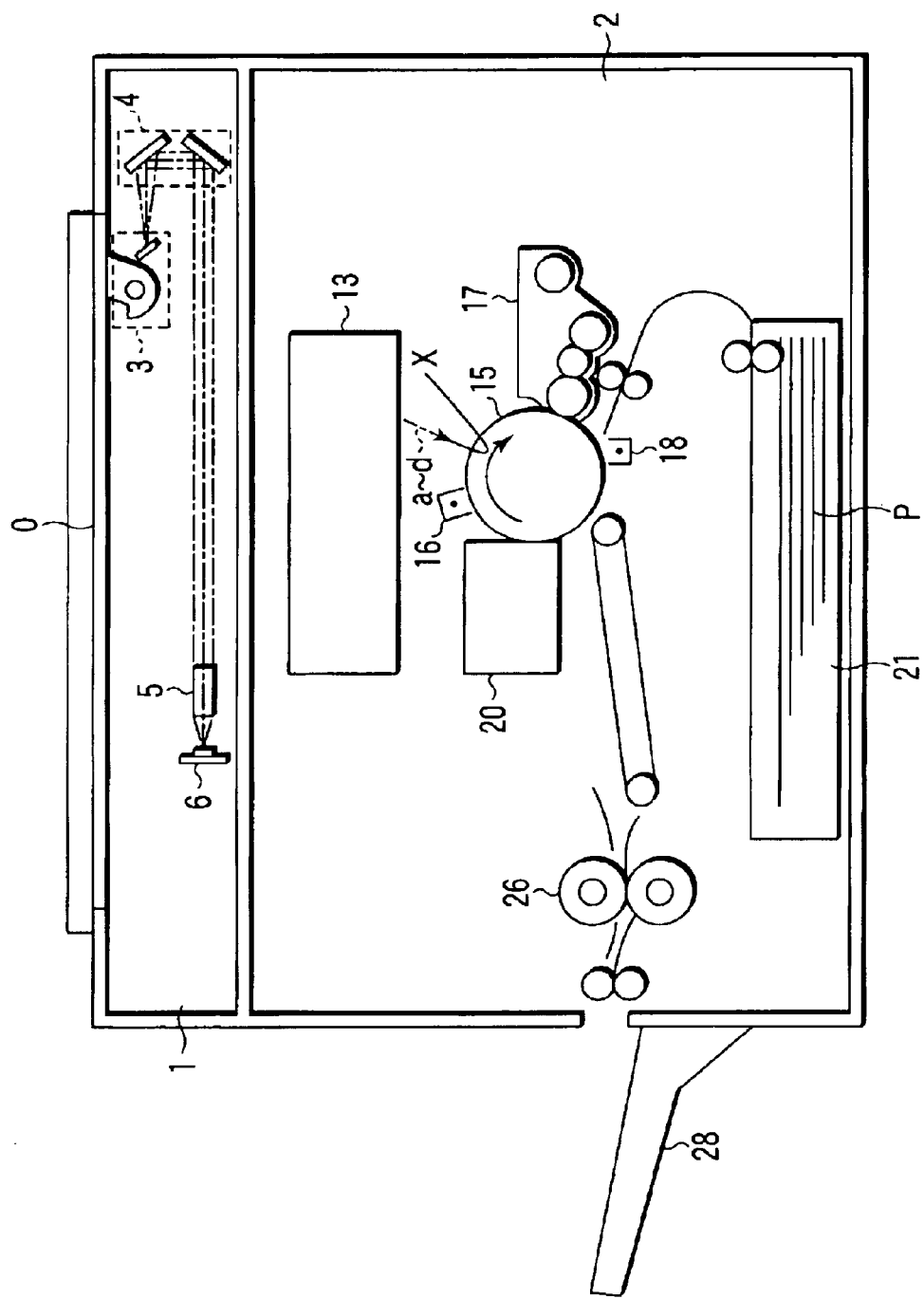
FIG. 1 is a schematic diagram showing a digital copying machine, which is an image forming apparatus according to this invention.

FIG. 1 is a schematic representation of a digital copying machine that is the image forming apparatus. The digital copying machine comprises a scanner section 1 for reading the image printed on an original O, and a printer section 2 for forming an image on a medium. The scanner section comprises a first carriage 3, second carriage 4, focus lens 5 and photoelectric transducer element 6. Both carriages 3 and 4 can move in the direction of the arrow that is shown in FIG. 1.

The first carriage 3 and second carriage 4 moves from the right to the left in FIG. 1 as a carriage-driving motor (not shown) is driven by a read timing signal. Light conveying the information provided on the original is applied to the focus lens 5. The focus lens 5 focuses the light on the light-receiving surface of the photoelectric transducer element 6.

Thus, the scanner section 1 reads, little by little, the image printed on the original O that is placed on the original table.

The printer section 2 comprises an optical unit (light-beam scanning apparatus) 13 and an electrophotographic image-forming section 14. An image-data processing section (not shown) processes an image signal generated by the scanner section 1 that has read the original O. The signal processed is supplied to semiconductor laser. The laser converts the signal into a laser beam (hereinafter called "beam"). In the digital copying machine of FIG. 1, the optical unit 13 is a multi-beam unit that has a plurality of lasers (for example, four lasers).

The semiconductor lasers that are provided in the optical unit 13 emit beams in accordance with a laser modulation signal output from the image-data processing section (not shown). A polygon mirror reflects the beams, which are applied from the optical unit 13 as scanning light beams. The optical unit 13 will be described later in detail.

The light beams output from the optical unit 13 are applied to a photosensitive drum (image-carrying member) 15. An electrostatic latent image that corresponds to the image signal is thereby formed on the photosensitive drum 15.

Around the photosensitive drum 15, a charger 16, developing device 15, transfer charger 18, cleaner 20 and the like are arranged. The charger 16 electrically charges the photoelectric drum 15.

The electrostatic latent image formed on the photosensitive drum 15 is developed into a toner image as the developing device 17 applies toner (developer) to the drum 15. The transfer charger 18 transfers the toner image from the photosensitive drum 15 onto a sheet P supplied.

The sheet P to which the toner image has been transferred is fed to a fixing device 26. The fixing device 26 fixes the toner image. The sheet P is then fed onto a copied sheet tray 28.

After the latent image has been transferred from the drum 15 to the sheet P, a cleaner 20 removes the residual toner from the surface of the photosensitive drum 15. The drum 15 resumes its initial state and is ready to form the next latent image on its surface.

The copying machine repeats the sequence of steps, described above, thus forming images one after another.

The optical unit 13 will be described in detail.

Figure 2:
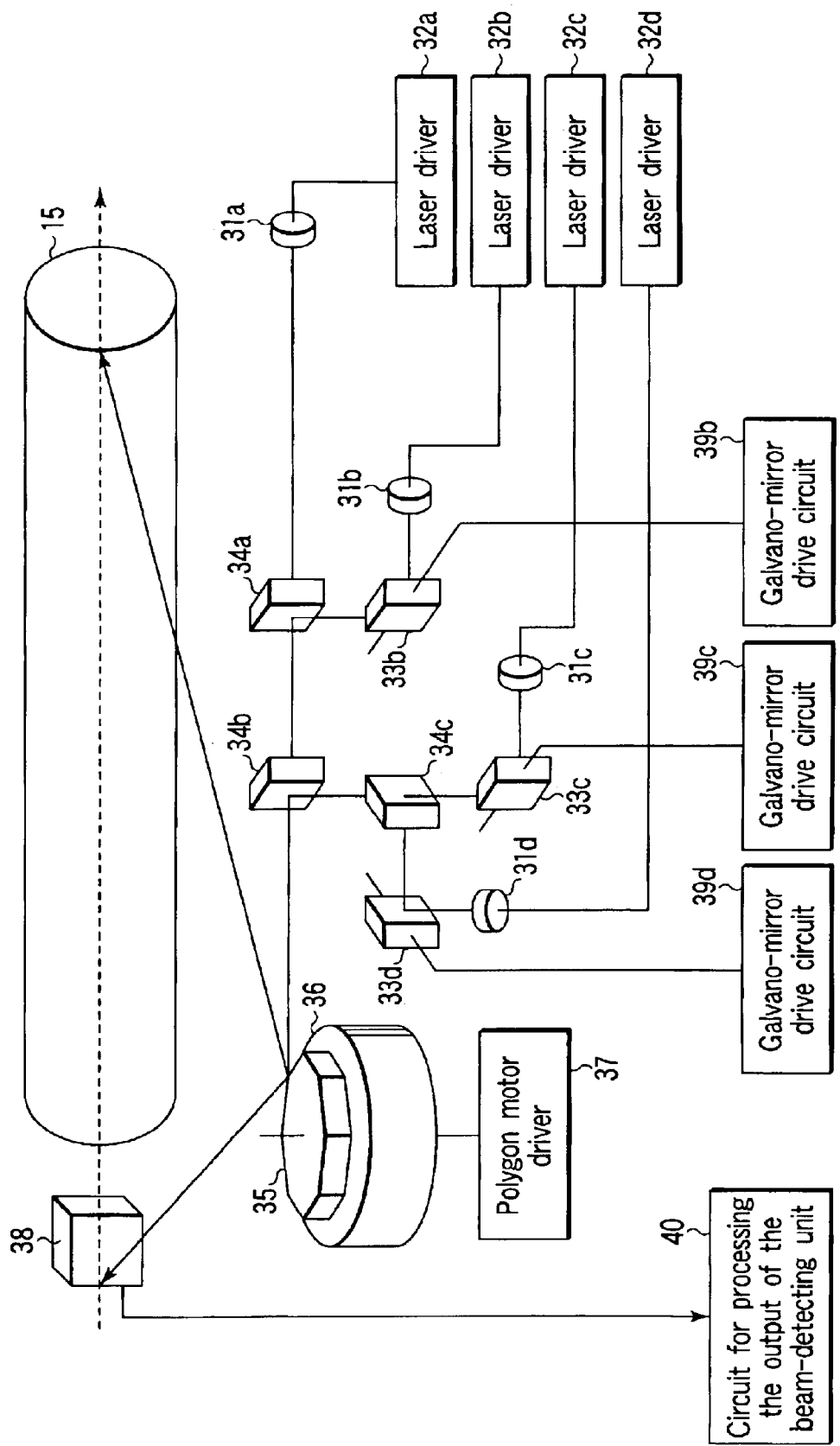
FIG. 2 is the optical unit incorporated in the digital copying machine.

FIG. 2 depicts the positional relation between the optical unit 13 and the photosensitive drum 15. As seen from FIG. 2, the optical unit 13 incorporates, for example, four semiconductor lasers 31a, 31b, 31c and 31d. The semiconductor lasers 31a, 31b, 31c and 31d simultaneously operate to from an image, each on one scanning line. This enables the digital copying machine to form an image at high speed, without the necessity of greatly increasing the rotational speed of the polygon mirror.

A laser driver 32a drives the lasers 31a, which emits a laser beam. The laser beam passes through a collimator lens (not shown) and half mirrors 34a and 34b and is applied to the polygon mirror 35 (scanning section).

The polygon mirror 35 is rotated by a polygon motor 36, which in turn is driven at a constant speed by a polygon-motor driver 37. The photosensitive drum 15 is scanned with the light reflected by the polygon mirror 35, in a prescribed direction and applied at an angular velocity that is determined by the rotational speed of the polygon motor 36. The light beam reflected by the polygon mirror 35 passes through an f-θ lens (not shown). The light beam is applied to the light-receiving surface of a beam-detecting section 38 and the surface of the photosensitive drum 15.

A laser driver 32b drives the lasers 31b, which emits a laser beam. This laser beam passes through a collimator lens (not shown), is reflected by a galvano mirror 33b and the half mirror 34a. The beam then passes through the half mirror 34b and is applied to the polygon mirror 35.

A laser driver 32c drives the lasers 31c, which emits a laser beam. The laser beam passes through a collimator lens (not shown), is reflected by a galvano mirror 33c and passes through the half mirror 34c. The beam is then reflected by the half mirror 34b and is applied to the polygon mirror 35.

A laser driver 32d drives the lasers 31d, which emits a laser beam. The laser beam passes through a collimator lens (not shown), is reflected by a galvano mirror 33d and the half mirror 34c. The beam is further reflected by the half mirror 34b and is applied to the polygon mirror 35.

The polygon mirror 35 reflects the light beams emitted from the lasers 31b, 31c and 31d, guiding each beam to the light-receiving surface of the beam-detecting section 38 and to the surface of the photosensitive drum 15, like the light beam emitted from the laser 31a.

The laser drivers 32a to 32d incorporate an automatic power control (APC) circuit each. The laser drivers 32a to 32d drive the lasers 31a to 31d, respectively, at power levels set by a main control section (CPU) 51, which will be described later.

The half mirrors 34a, 34b and 34c synthesize the light beams emitted from the lasers 31a, 31b, 31c and 31d. Four beams propagate to the polygon mirrors 35.

The four light beams can illuminate the photosensitive drum 15 at the same time. The digital copying machine can therefore record an image four times as fast as the copying machine of single-beam type, if the polygon mirror 35 rotates at the same speed as in the single-beam type-copying machine.

Galvano-mirror drive circuits 39b, 39c and 39d drive the galvano mirrors 39b, 39c and 39d, respectively. The galvano mirrors adjust (control) the positions the light beams emitted from the lasers 31b, 31c and 31d takes in the sub-scanning direction, with respect to the position the light beam emitted from the laser 31a assumes.

The beam-detecting section 38 detects the positions where and when the four light beams pass. It also detects the power (i.e., intensity) of each of these light beams. The beam-detecting section 38 is located near one end of the photosensitive drum 15. The beam-detecting section 38 generates detection signals. The detection signals are used to accomplish three controls. First, they control the galvano mirrors 33b, 33c and 33d (to control image-forming positions in the sub-scanning direction). Second, they control the light-emitting powers of the lasers 31a, 31b, 31c and 31c. Third, they control the timing of driving the lasers (to control image-forming positions in the main scanning direction). An output-processing circuit 40 is connected to the beam-detecting section 38, to help the section 38 to generate the control signals.

The control system provided in the digital copying machine of FIG. 1 will be described.

FIG. 3 illustrates the control system provided in the digital copying machine that incorporates the multi-beam optical unit 13. The control system comprises a main control section 51. The main control section 51 is, for example, a CPU. The main control section 51 is connected to a memory 52, control panel 53, communications interface (I/F) 54, laser drivers 32a, 32b, 32c and 32d, polygon-mirror motor driver 37, galvano-mirror drive circuits 39b, 39c and 39d, output-processing circuit 40 for processing the output of the beam-detecting section, synchronization circuit 55 and image-data interface (I/F) 56.

The image-data I/F 56 is connected to the synchronization circuit 55. An image-data processing section 57 and a page memory 58 are connected to the image-data I/F 56. The scanner section 1 is connected to the image-data processing section 57. An interface (I/F) 59 is connected to the page memory 58. The laser drivers 32a, 32b, 32c and 32d are connected to the synchronization circuit 55.

How the image data is processed to form an image will be explained in brief.

To copy the image printed on the original placed on the original table 7, the scanner section 1 reads the image, generating image data representing the image. The image data is supplied to the image-data processing section 57. The section 57 performs a prescribed process on the image signal supplied from the scanner section 1.

The image data is sent from the image-data processing section 57 to the image-data I/F 56. The image-data I/F 56 distributes the image data to the four laser drivers 32a, 32b, 32c and 32d.

The synchronization circuit 55 generates a clock signal that is synchronous with the time each light beam reaches the beam detecting section 38. In synchronism with the clock signal, the image data is supplied, as laser modulation signal, from the image-data I/F 56 to the laser drivers 32a, 32b, 32c and 32d.

The synchronization circuit 55 includes a sample timer, a logic circuit and the like. The sample timer actuates the laser drivers 32a, 32b, 32c and 32d, which cause the lasers 31a, 31b, 31c and 31d to emit light beams in a non-image region, thereby to control the intensities of the light beams. The logic circuit makes the lasers 31a, 31b, 31c and 31d emit light beams when the previously emitted beams reach the beam-detecting section 38, thereby to detect the positions the light beans assume in the main scanning direction.

The image data is thus transferred in synchronism with the scanning of the drum with the light beams. This makes it possible to form an image at a correct position in the main scanning direction.

The control panel 53 is a man-machine interface that starts the copying procedure and sets a desired number of copies to be made.

The digital copying machine is configured not only to copy the original, but also to form images represented by any image data that has been input via the interface (I/F) 59 connected to the page memory 58.

The galvano-mirror drive circuits 39b, 39c and 39d are circuits that are designed to drive the galvano mirrors 33b, 33c and 33d, respectively, in accordance with instructions supplied from the main control section 51. That is, the main control section 51 controls the galvano-mirror drive circuits 39a, 39b and 39d, which in turn control the angles of the galvano mirrors 33b, 33c and 33d, respectively.

The polygon-mirror motor driver 37 is a driver that drives the polygon motor 36, which rotates the polygon mirror 35 that scan the drum with the aforementioned four light beams.

As indicated above, the laser drivers 32a, 32b, 32c and 32d cause the lasers to emit light beams, in accordance with the image data. It performs another function of make the lasers 31a, 31b, 31c and 31d emit light beams, in accordance with a light emission signal supplied from the main control section 51, irrespectively of the image data.

The main control section 51 sets the intensities of beams that the lasers 31a, 31b, 31c and 31d should emit. The intensities thus set may be changed in accordance with the changes in process conditions, the detected positions where the beams pass, and the like.

The memory 52 stores information that is indispensable for controls. For example, it stores the control values for the galvano mirrors 33b, 33c and 33d, the circuit characteristics (the offset value of an amplifier) for detecting the positions where the beams pass, and the like. The data items stored in the memory 52 enable the optical unit 13 to form images immediately after the power switch to the copying machine is closed.

A laser beam scanning apparatus according to the first embodiment will be described.

Figure 4:
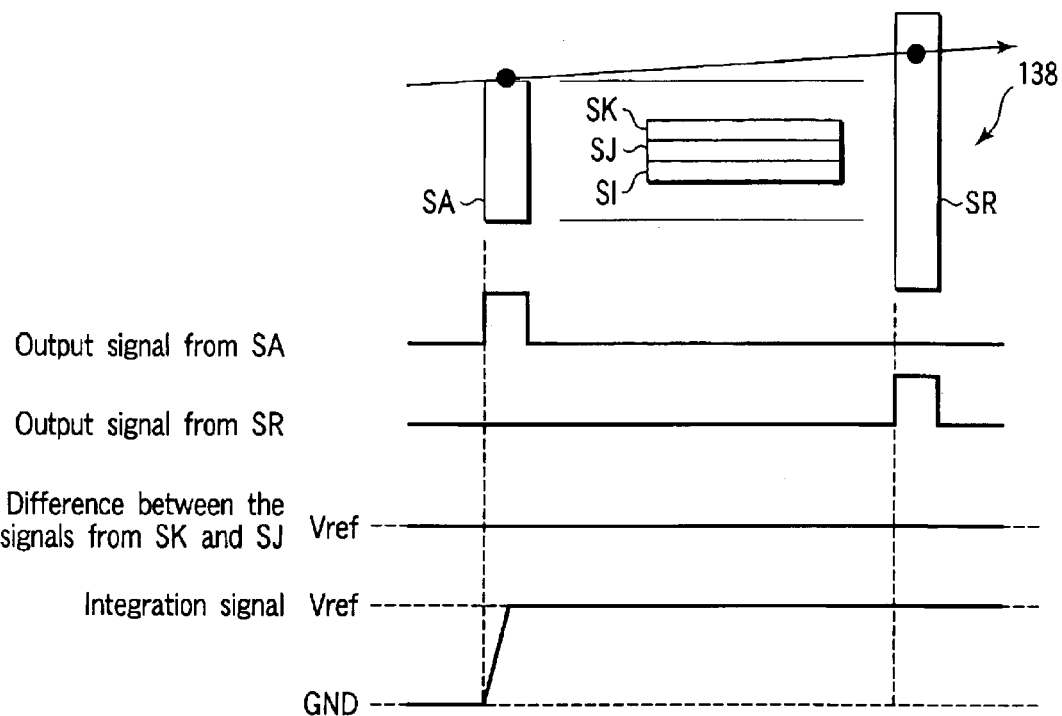
FIG. 4 is a chart explaining how the beam-passing position sensor operates in the first embodiment of the invention.

FIG. 4 is a magnified view of the light-receiving part (beam-passing position sensor) 138 of a beam detecting section according to the first embodiment. FIG. 4 is also a chart that explains how the sensor operates to detect the positions where beams pass.

The light-receiving part 138 comprises timing sensors SA and SR and beam-passing position sensors SI, SJ and SK. These sensors are photoelectric transducer elements (photodiodes). Each of them generates a current that is proportional of the amount of light it has received.

The timing sensor SA generates an integration reset signal for an integrator that integrates the outputs of the beam-passing position sensors SI, SJ and SK. The timing sensor SA constitutes the first beam-detecting section.

The timing sensor SR generates a signal that initiates the A/D conversion of the integrated outputs of the beam-passing position sensors SI, SJ and SK. It also generates a signal that will be supplied to the CPU, indicating that the completion of the A/D conversion and the timing of acquiring the data A/D-converted. The timing sensor SR constitutes the third beam-detecting section.

The beam-passing position sensors SI, SJ and SK cooperate to detect the position where a beam passes. The position is detected from the difference between the outputs of the sensors SI and SJ and the difference between the outputs of the sensors SJ and SK. The beam-passing position sensors SI, SJ and SK are arranged at regular intervals in a direction intersecting, at right angles, with the beam scanning direction. The beam-passing position sensors SI, SJ and SK constitute the second beam-detecting section.

The beam-passing positions can be set at said intervals if they are shifted to the midpoint between the beam-passing position sensors SI and SJ and the midpoint between the beam-passing position sensors SJ and SK. The timing sensors SA and SR extend for different distances in the sub-scanning direction (i.e., the direction intersecting, at right angles, with the beam scanning direction). More correctly, the timing sensor SR located downstream of the scanning direction is longer. This is a characterizing feature of the light-receiving part 138.

FIG. 4 shows the case where the beam-passing position sensor according to the first embodiment fails to lie in parallel to the laser beam applied from the polygon mirror 35. The laser beam applied from the polygon mirror 35 travels in the direction of the arrow shown in FIG. 4.

FIG. 5 illustrates a beam-passing position detecting system that converts the sensor outputs (currents) to beam-passing position information. The timing sensor SR is connected at one end to the input of an I/V converter A. The output of the I/V converter A is connected to the input of a first binarization circuit 71. The output of the circuit 71 is connected to an integrator 74 and the CPU 51. The timing sensor SR is connected at one end to the input of an I/V converter B. The output of the I/V converter B is connected to the input of second binarization circuit 72. The output of the circuit 72 is connected to an A/D converter 75 and also to the CPU 51. The beam-passing position sensor SK is connected at one end to the input of an I/V converter K. The beam-passing position sensor SI is connected at one end to the input of an I/V converter I.

The output of the I/V converter K is connected to the input of the first differential amplifier 76. The output of an I/V converter J is connected to the input of the first differential amplifier 1, too. The output of the I/V converter J is connected to the input of a second differential amplifier 77, too. The output of the first differential amplifier 76 and the output terminal of the second differential amplifier 77 are connected to an analog multiplexer 73. The analog multiplexer 73 is connected to the integrator 74 and the CPU 51. The A/C converter 75 is connected to the integrator 74 and the CPU 51.

When a laser beam travels over the timing sensor SA, the sensor SA generates a current. The I/V converter A converts the current to a voltage. The first binarization circuit 71 converts the voltage to a digital signal. The signal resets the integrator 74. The trailing edge of the signal is used as an integration reset signal.

When the laser beam travels over the beam-passing position sensors SK and SJ, the sensors SK and SJ generate currents, each having a magnitude corresponding to the position where the laser beam has passed. The I/V converters K and J convert the currents output from the sensors SK and SJ, respectively, to voltages. The first differential amplifier 76 finds the difference between these voltages. The output of the amplifier 76 is supplied via the analog multiplexer 73 to the integrator 74. The integrator 74 integrates the output of the amplifier 76. The A/D converter 75 converts the output of the integrator 74 to a digital signal.

The laser beam that travels over the beam-position sensors SJ and SI are processed in a similar way.

When the laser beam travels over the timing sensor SR, the sensor SR generates a current. The I/V converter R converts the current to a voltage. The second binarization circuit 72 converts the voltage to a digital signal. At the leading edge of the digital signal, the A/D converter 75 converts the output of the integrator to a digital signal. At the trailing edge of the digital signal, the CPU 51 receives the output of the A/D converter 75, which is beam-passing position information.

The CPU 51 can therefore detect the positions where laser beams have passed. In accordance with the beam-passing position information the CPU 51 controls the galvano mirrors, i.e., beam actuators. As a result, the laser beams are applied to desired positions.

In the first embodiment, the timing sensor SR located downstream extends longer in the sub-scanning direction than the timing sensor SA that is located upstream. Hence, an SR signal is reliably output whenever an SA signal is generated.

The sensor SA serves to make the beam-detecting system start operating. Thus, laser beams are applied in a desired manner when an SA signal is generated. The CPU 51 can obtain the beam-passing position information.

Therefore, a conversion-starting signal can be output as is desired even if any laser beam is somewhat inclined to the light-receiving part. The CPU can receive the signal obtained by means of A/D conversion, as one that represents the beam-passing position.

Figure 6:
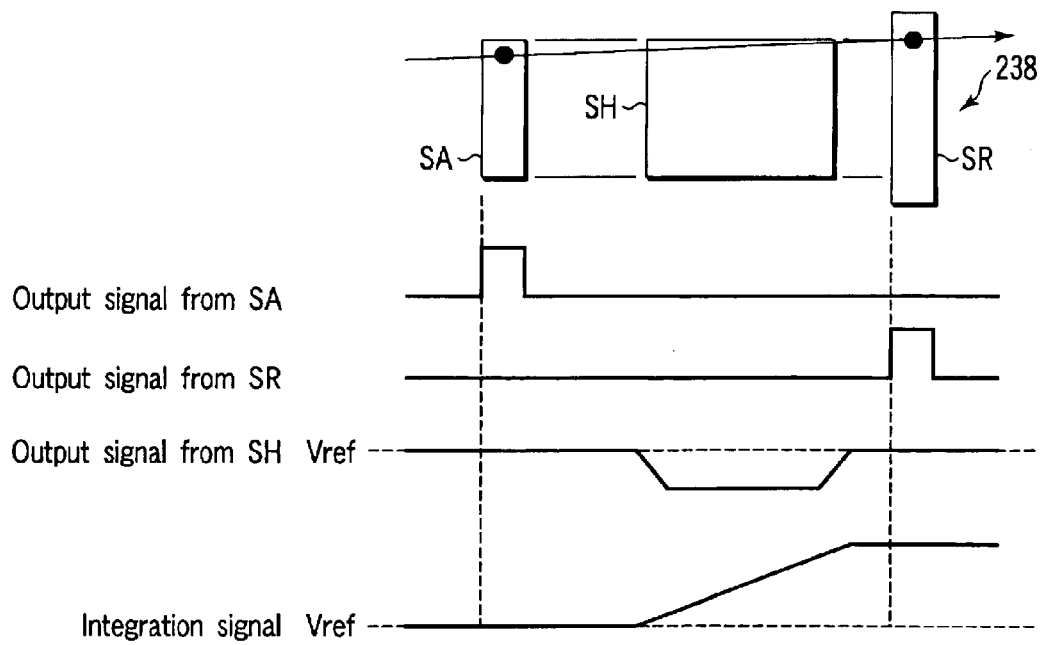
FIG. 6 is a chart explaining how the intensity of a light beam is detected in the first embodiment.
Figure 7:
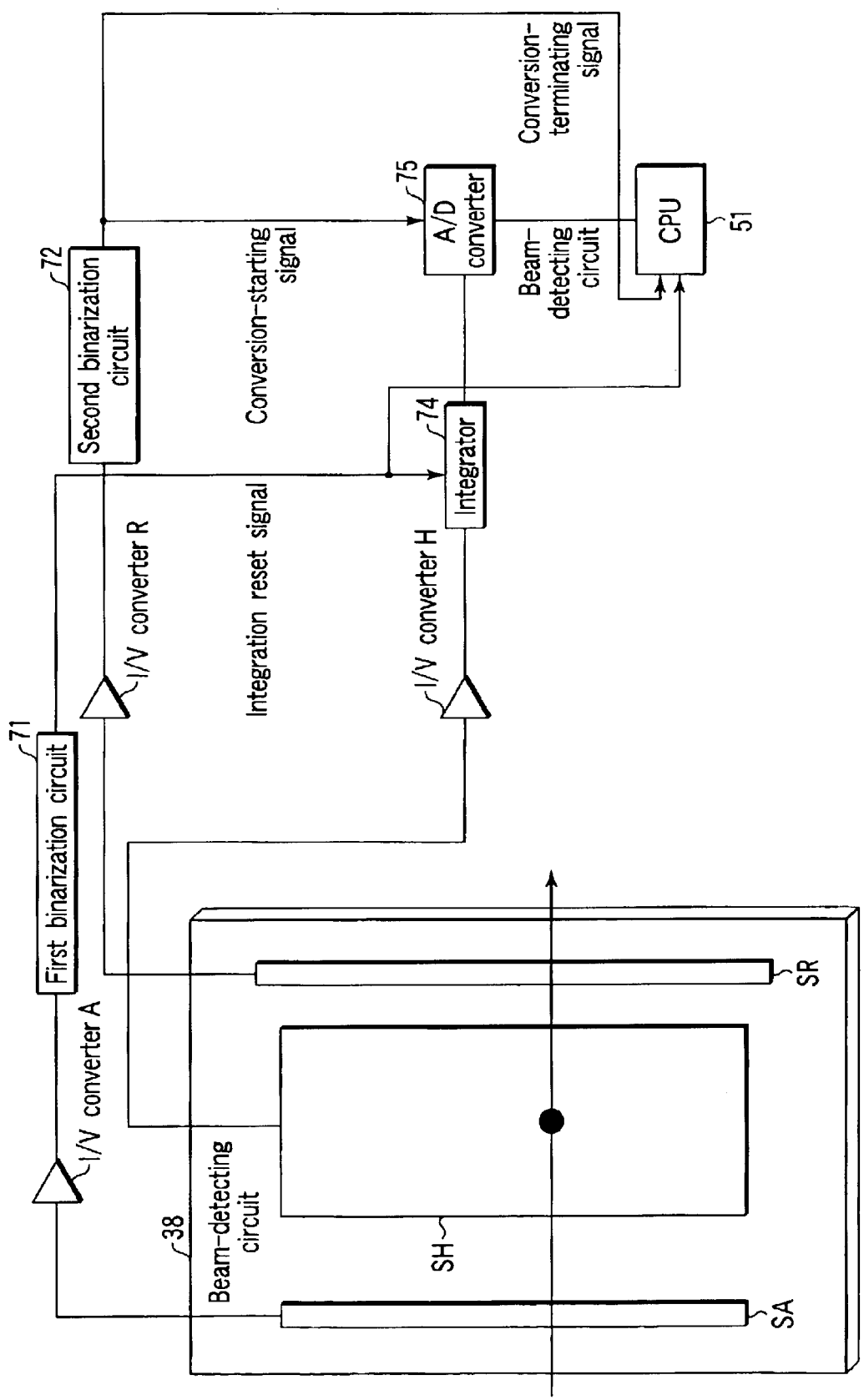
FIG. 7 is a block diagram of the beam-intensity detecting system incorporated in the first embodiment.

A modification of the first embodiment will be described, with reference to FIG. 6 and FIG. 7.

The light-receiving part of the modification differs from the light-receiving part 138 shown in FIG. 4 in two respects. First, a beam-passing position sensor SH is used in place of the beam-passing position sensors SK, SJ and SI. Second, the length in the sub-scanning direction is the same as the length of the timing sensor SA. FIG. 7 shows a beam-passing position system that converts sensor outputs (currents) to beam-passing position information. The timing sensors SA and SR are identical to those illustrated in FIG. 5 and will not be described. The beam-passing position sensor SH is connected at one end to the input of an I/V converter H. The output of the I/V converter H is connected to the integrator 74. The A/D converter 75 is connected to the integrator 74 and the CPU 51.

When a laser beam travels over the beam intensity sensor SH, the sensor SH generates a current that corresponds to the intensity of the laser beam. The I/V converter H converts the current to a voltage, which is input to the integrator 74. The integrator 74 integrates the voltage. The A/D converter 75 converts the output of the integrator 74 to a digital signal.

When the laser beam travels over the timing sensor SR, the sensor SR generates a current. The I/V converter R converts the current to a voltage. The second binarization circuit 72 converts the voltage to a digital signal. A threshold value is set in the second binarization circuit 72. The threshold value is applied in converting the analog signal from the CPU 51 to a digital signal.

At the leading edge of this signal, the A/D converter 75 converts the output of the integrator (i.e., analog voltage signal) to a digital signal. The CPU 51 receives the beam-intensity information, or the output of the A/D converter 75, at the trailing edge of the signal. That is, the output signal of the timing sensor SR is used as a conversion-starting signal that initiates the A/D conversion of the output of the integrator and also as a conversion-terminating signal that causes the CPU 51 to receive the output of the A/D converter 75.

Thus, the CPU 51 can determine the intensity of the laser beam. The CPU 51 generates beam-intensity information from the beam intensity determined. The beam-intensity information is supplied to a laser driver (not shown), whereby the intensity of the laser beam is controlled to a desired value.

In the first embodiment, the timing sensors that detect beams have different lengths measured in the sub-scanning direction (i.e., the direction intersecting, at right angles, with the main scanning direction). Correct beam information (beam-passing position and beam intensity) can, therefore, be provided even if the laser beams applied from the polygon mirror are not parallel to the light-receiving part.

Hence, the beams can be applied, spaced apart at a desired pitch, and can be controlled to have a desired intensity.

Thus constructed, the first embodiment can help to provide an image forming apparatus that forms high-quality images free of jitter that may results if the beams are spaced at a wrong pitch or fail to have a desired intensity.

The second embodiment will be described.

Figure 8:
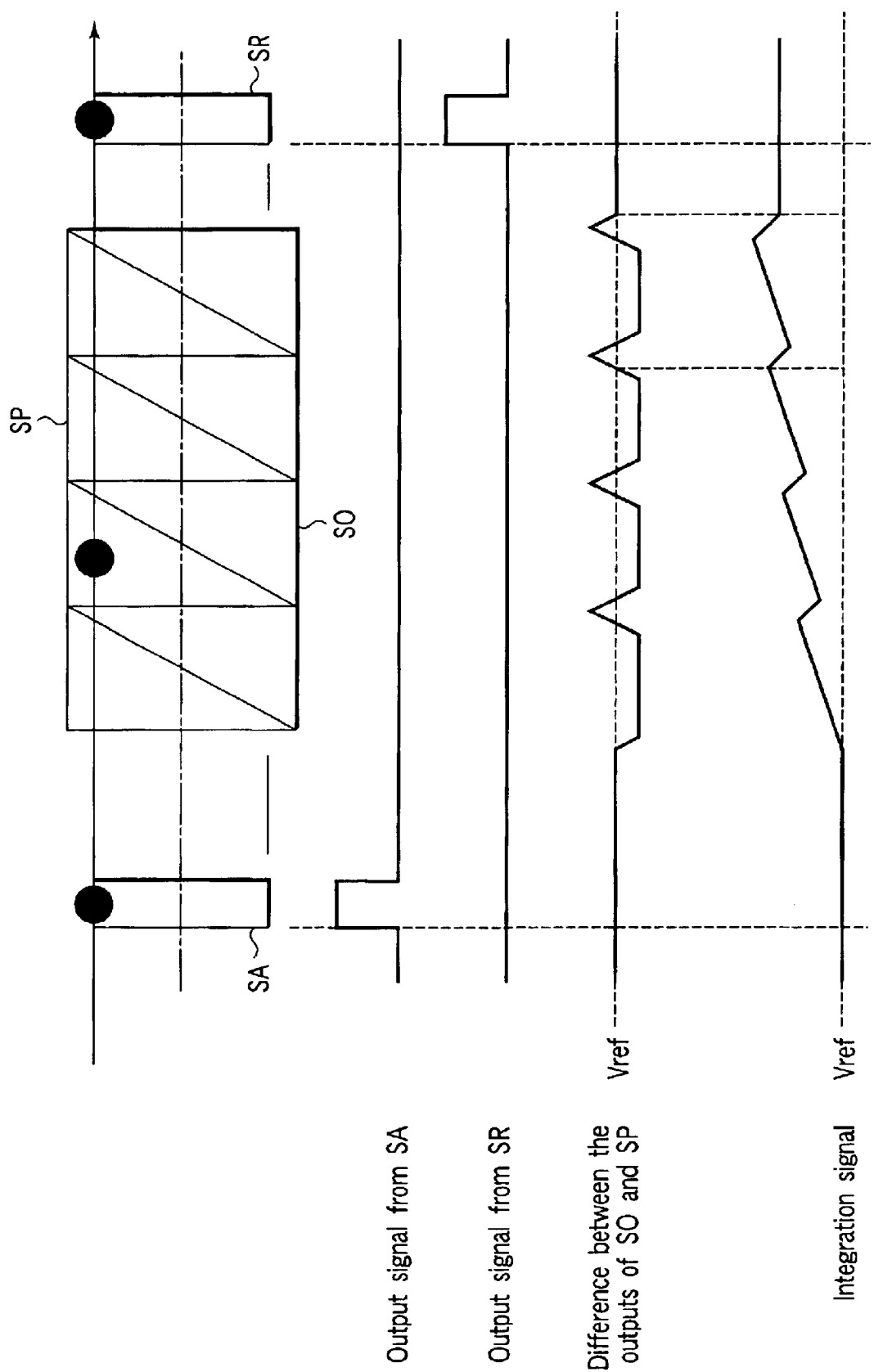
FIG. 8 is a chart explaining how the beam-passing position sensor operates in the second embodiment of the invention.

FIG. 8 is a chart including a magnified view of the light-receiving parts of a conventional beam-detecting section 338 (i.e., beam-passing position sensor), and explaining how the beam-passing position sensor operates. The light-receiving parts SA, SR, SO and SP are photoelectric transducer elements (photodiodes). Upon receiving light, light-receiving part generates a current that is proportional to the intensity of the light. The functions of the light-receiving parts will be described below.

The timing sensor SA generates an integration reset signal for the integrator that integrates the outputs of the beam-passing position sensors SO and SP.

The timing sensor SR generates a conversion-starting signal that initiates the A/D conversion of the signal obtained by integrating the outputs of the beam-passing position sensors SO and SP. The timing sensor SR also generates a conversion-terminating signal. The conversion-terminating signal is supplied to CPU, indicating the completion of the A/D conversion and informing the time the CPU should receive the digital data generated by the A/D conversion.

The beam-passing position sensors SO and SP comprise one sawtooth-shaped photodiode each. The position where a beam passes is detected from the difference between the outputs of the sensors SO and SP.

The beam-passing position sensors detect the position where a beam passes while moving fast, after it has been applied from a polygon mirror and which is moving at high speed. How the sensors detect the position will be explained, with reference to FIG. 8 and FIG. 9.

Figure 9:
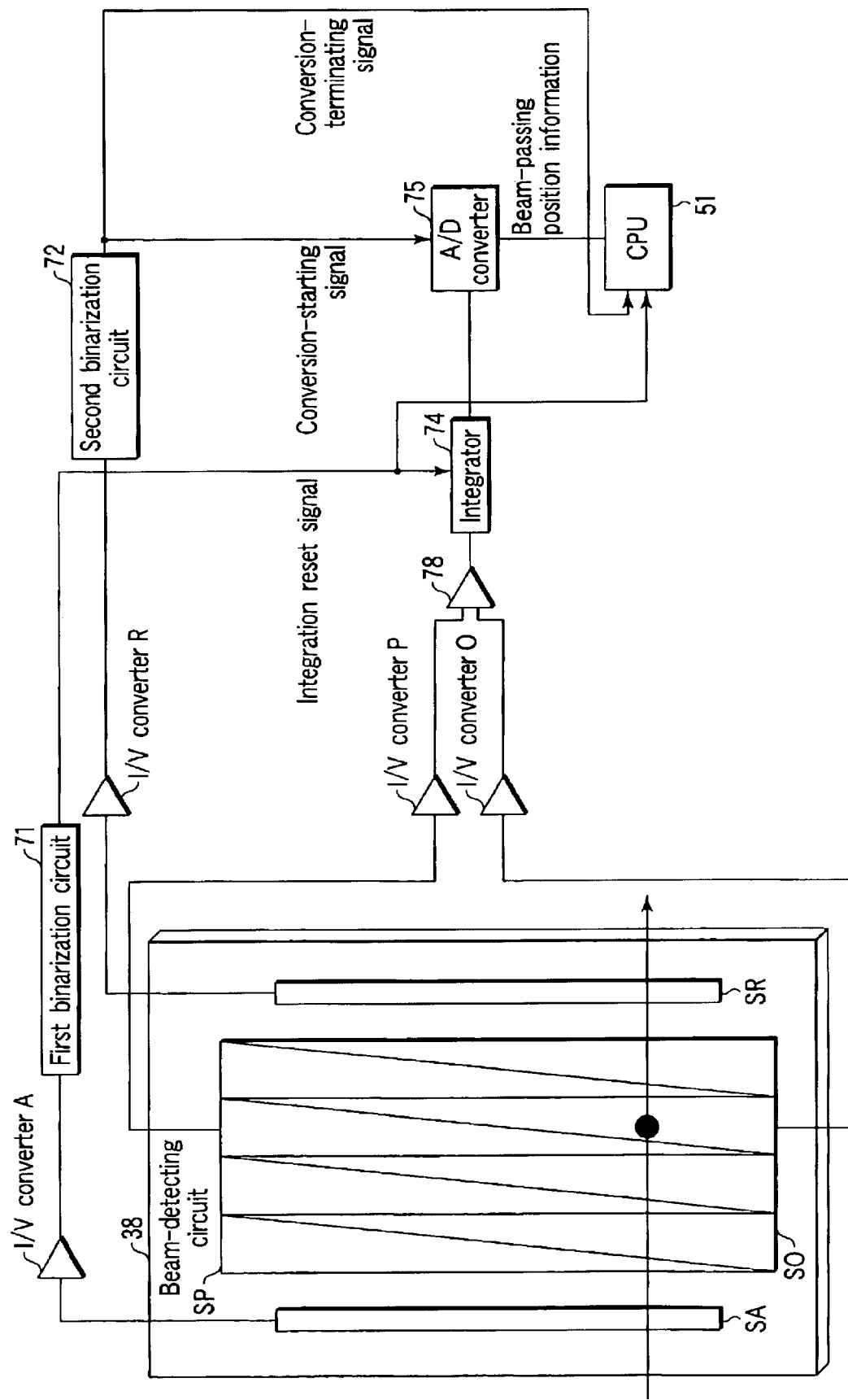
FIG. 9 is a block diagram showing the how the beam-passing position sensor operates in the second embodiment.

FIG. 9 shows a beam-passing position system that converts sensor outputs (currents) to beam-passing position information. A beam-passing position sensor SA is connected at one end to the input of an I/V converter A. The output of the I/V converter A is connected to one end of a first binarization circuit 71. The other end of the first binarization circuit 71 is connected to an integrator 74 and a CPU 51. A timing sensor SR is connected at one end to the input of an I/V converter B. The output of the I/V converter B is connected to one end of a second binarization circuit 72. The other end of the second binarization circuit 72 is connected to an A/D converter 75 and the CPU 51. A beam-passing position sensor SO is connected at one end to an I/V converter O. A beam-passing position sensor SP is connected at one end to an I/V converter P. The outputs of the I/V converters O and P are connected to the inputs of a differential amplifier 78. The output of the differential amplifier 78 is connected to the integrator 74. The A/D converter 75 is connected to the integrator 74 and the CPU 51.

A laser beam applied from the polygon mirror 35 travels in the direction of the arrow shown in FIG. 8. When the laser beam passes through the timing sensor SA, the sensor SA generates a current. The I/V converter A converts the current to a voltage. The first binarization circuit 71 converts the voltage to a digital signal.

A threshold value is set in the first binarization circuit 71. The threshold value (not shown) is applied in converting the analog signal from the CPU 51 to a digital signal. The digital signal resets the integrator 74. (The electric charge is released from the integration capacitor.) The integrator is reset at the trailing edge of the digital signal. That is, the digital signal is used as an integration reset signal, too.

When the laser beam travels over the beam-passing position sensors SO and SP, the sensors SO and SP (i.e., photodiodes) generate a current each. The I/V converter O converts the output current of the sensor SO to a voltage, and the I/V converter P converts the output current of the sensor SP to a voltage. The differential amplifier 78 finds the difference between the voltages. The integrator 74 integrates the voltage difference. The A/D converter 75 converts the output of the integrator 74 to a digital signal.

When the laser beam travels over the timing sensor SR, the sensor SR generates a current. The I/V converter R converts the current to a voltage. The second binarization circuit 72 converts the voltage to a digital signal. A threshold value is set in the second binarization circuit 72. The threshold value (not shown) is applied in converting the analog signal from the CPU 51 to a digital signal.

At the leading edge of this digital signal, the A/D converter 75 converts the output of the integrator 74 (i.e., voltage) to a digital signal. At the trailing edge of the digital signal, the CPU 51 receives the output of the A/D converter 75, i.e., the beam-passing position information. That is, the output of the sensor SR is used as a signal for initiating the A/D conversion of the output of the integrator 74 and as a signal for terminating the A/D conversion and supplying the output of the A/D converter 75 to the CPU 51.

Therefore, the CPU 51 can detect the position where the laser beam has passed. The CPU 51 controls the galvano mirrors, i.e., beam actuators. As a result, the laser beams are applied to desired positions.

In this invention, the beam-passing position sensors SO and SP extend longer than the timing sensors SA and SR that serve to detect the beam, in the sub-scanning direction (the direction intersecting, at right angles, with the main scanning direction). Hence, they do not malfunction at the boundary between their detection regions and can, therefore, serve to guide the beam to a desired position.

The length of the beam intensity sensor in the sub-scanning direction (the direction intersecting, at right angles, with the main scanning direction), which is described in the description of the first embodiment, is greater than the lengths of the timing sensors SA and SR that serve to detect the beam, though not illustrated. This makes it possible to control the intensity of the beam to a desired value.

The timing sensors SA and SR that serve to detect the beam extend shorter than the beam-passing position sensors SO and SP in the sub-scanning direction. Therefore, no beams are detected at the boundary between the sensors SO and SP, where any sensor output is unstable. Namely, no currents are generated in the boundary between the sensors SO and SP. Neither the timing sensor SA nor the timing sensor SR outputs a current. Thus, no beam-detecting operation starts, and no conversion-terminating signal is output to the CPU 51. Hence, the CPU 51 would not receive any erroneous beam-passing position information.

FIG. 9 depicts the beam-passing position detecting system according to the second embodiment.

As indicated above, the second embodiment can prevent erroneous detection of beam information when a beam passes through the boundary between the beam-passing position sensors. The beam can therefore be guided to the desired position.

The second embodiment can therefore provide an image forming apparatus that can form high-quality images free of jitter that may results if the beams are spaced at a wrong pitch or fail to have a desired intensity.

Figure 10:
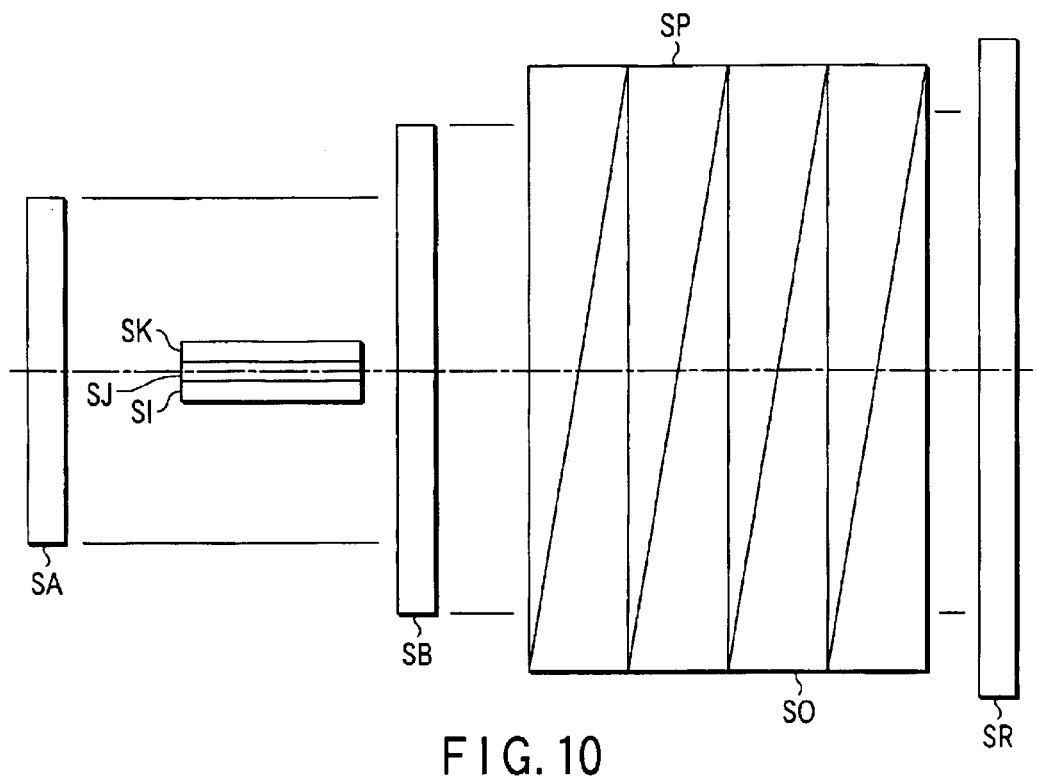
FIG. 10 is a diagram illustrating a combination of the first and second embodiments.

FIG. 10 illustrates a combination of the first and second embodiments.

In this configuration, the timing sensor SB extends longer than the timing sensor SA, in the sub-scanning direction (the direction intersecting, at right angles, with the main scanning direction). Note that the timing sensors SB and SA are located downstream and upstream, respectively, with respect to the beam-passing position sensors SI, SJ and SK.

The beam-passing position sensors SO and SP extend longer in the sub-scanning direction than the timing sensor SB that serves to detect a beam. The timing sensor SR extends longer in the sub-scanning direction than the timing sensor SB. Note that the sensors SB and SR are located upstream and downstream, respectively, with respect to the beam-passing position sensors SO and SP.

The system, which is a combination of the first and second embodiments, can achieve the advantages of the first embodiment and those of the second embodiment.

The third embodiment will be described below.

Figure 12:
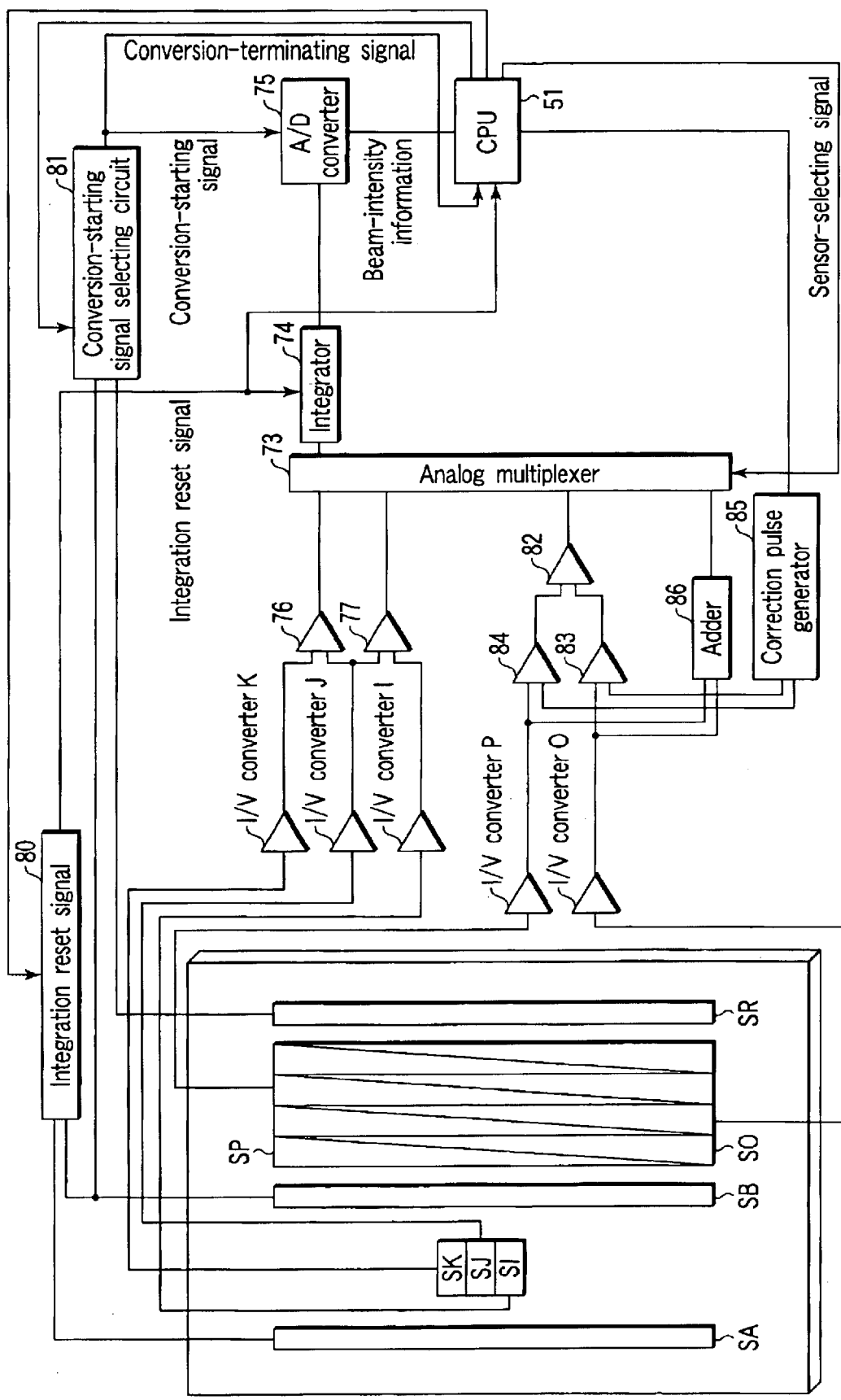
FIG. 12 is a block diagram of the beam-passing position detecting system incorporated in the third embodiment of the invention.

FIG. 12 shows the beam-passing position detecting system according to the third embodiment of the invention. The components identical to those of the first and second embodiment will not be described.

A timing sensor SA is connected at one end to an integration-reset signal selecting circuit 80. A timing sensor SB is connected at one end to the integration-reset signal selecting circuit 80 and a conversion-starting signal selecting circuit 81. The integration-reset signal selecting circuit 80 is connected to an integrator circuit 74 and a CPU 51. The conversion-starting signal selecting circuit 81 is connected to an A/D converter 75 and the CPU 51. An analog multiplexer 73 is connected to the output of a third differential amplifier 82. The inputs of the third differential amplifier 82 are connected to the outputs of a fourth and fifth differential amplifiers 83 and 84, respectively. The inputs of the fourth differential amplifier 83 are connected to the output of an I/V converter O and a correction pulse generator 85, respectively. The inputs of the fifth differential amplifier 84 are connected to the output of an I/V converter P and the correction pulse generator 85. The correction pulse generator 85 is connected to the CPU 51. An adder 86 is connected to the input of the I/V converter O, the input of the I/V converter P and the analog multiplexer 73.

Figure 11:
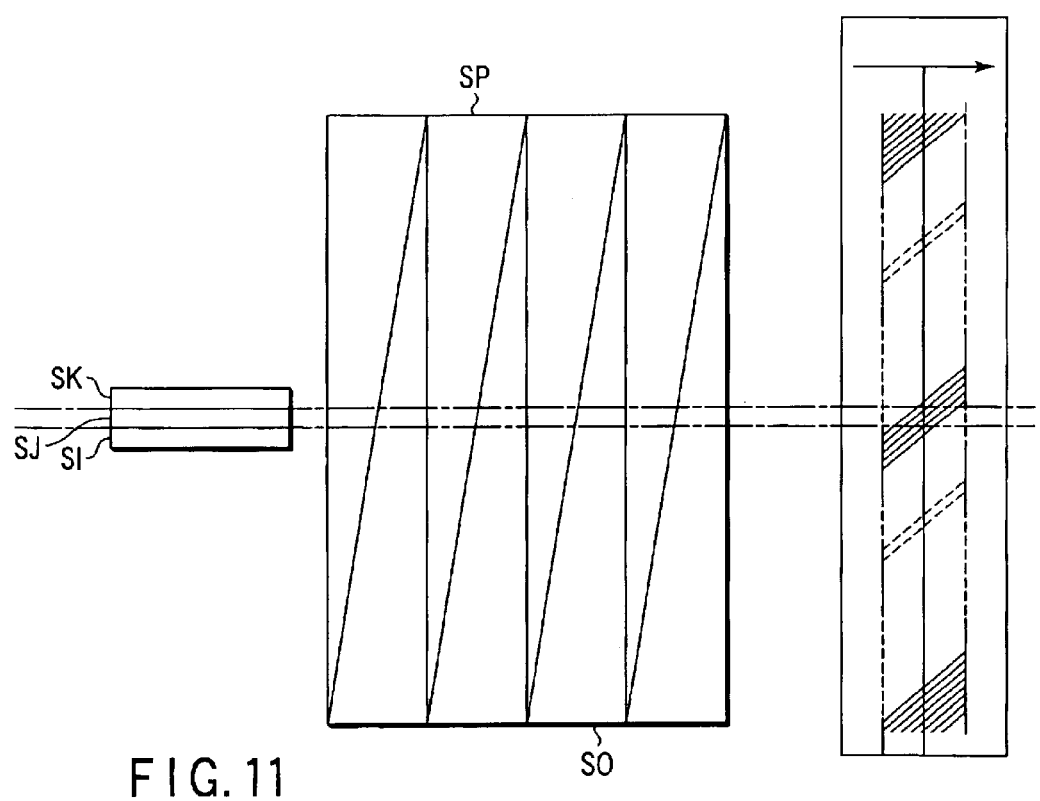
FIG. 11 is a diagram showing an output of the conventional beam-passing position sensor and the position where the light beam passes.

FIG. 11 diagrammatically shows how the outputs of relative position sensors SO and SP are normalized by using reference pitch sensors SI, SJ and SK. It also shows the relation between the outputs of the sensors SO and SP, on the one hand, and the beam-passing position, on the other.

How the outputs are normalized is detailed in U.S. Pat. No. 6,392,684.

The normalization will be described in brief.

The light-receiving parts of the relative position sensors SO and SP extend long in the direction that intersects, at right angles, with the scanning direction, in order to detect any beam that travels in a large field.

Nonetheless, the system of FIG. 12 switches the detection range from one to another, thereby to detect a beam-passing position with high precision. More precisely, the correction pulse generator 78 shown in FIG. 12 switches the detection range, successfully detecting the beam-passing position with high precision. That is, an appropriate detection range is selected in accordance with the beam-passing position detected last, and then a beam is detected and controlled. (An appropriate range is selected from a plurality of choices illustrated in the characteristic graph of FIG. 11.)

The detection characteristic is that errors may result from the changes in the intensity of beams applied, the difference in sensitivity between the photodiodes, and the different circuit constants of the circuits constituting the detection system. The sensitivity of the detection system (i.e., voltage equivalent to $V/\mu m:1 \mu m$) should therefore be normalized. The reference pitch is applied to normalize the sensitivity.

As may be seen from FIG. 12, the CPU 51 performs a control, applying a movable beam to the midpoint between the reference pitch sensors SK and SJ. While holding the beam-passing position, the CPU 51 switches the detection ranges of the relative position sensors SO and SP. The outputs that the sensors SO and SP generates when the CPU 51 selects appropriates detection ranges are recorded.

The CPU 51 then performs another control, applying the movable beam to the midpoint between the reference pitch sensors SJ and SI. While holding the beam-passing position, the CPU 51 records the outputs of the relative position sensors SO and SP. (Either relative position sensor has such a detection range that it can reliably detect the reference pitch of any reference pitch sensor.)

The reference pitch sensors SI, SJ and SK are arranged at a prescribed pitch in the direction that intersects, at right angles, with the beam-scanning direction. Hence, the difference between the outputs that the relative position sensors SO and SP generates when the beam is applied to the midpoint between the reference pitch sensors SO and SP or between the reference pitch sensors SJ and SI is equivalent to said reference pitch. This value is the sensitivity of the relative position sensors SO and SP. The operation described above normalizes the relative position sensors SO and SP.

The third embodiment of this invention can solve the above-mentioned problem by adjusting the intensity of the laser beam.

Figure 13:
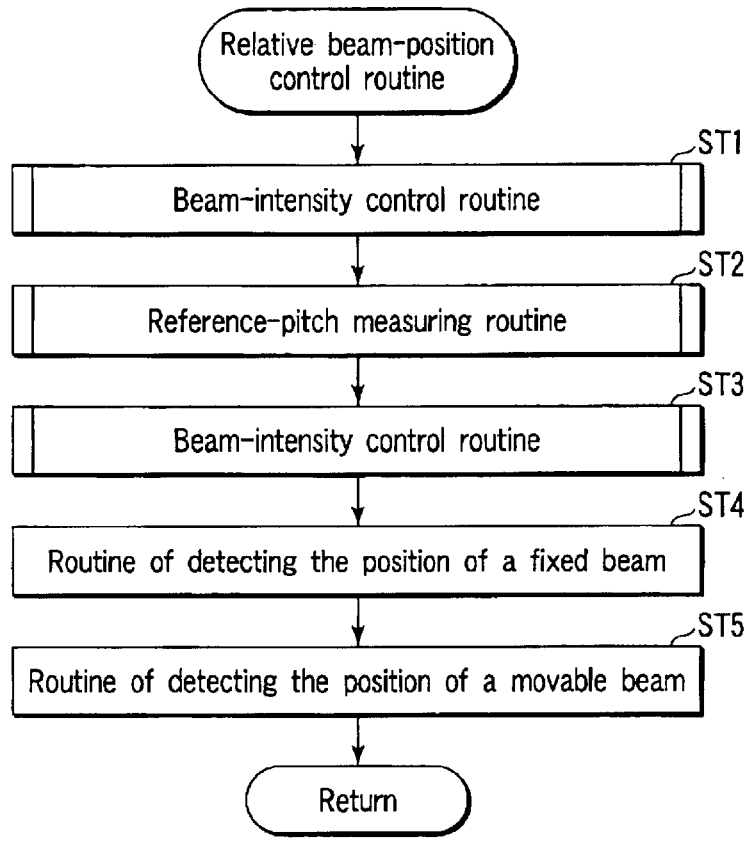
FIG. 13 is a flowchart explaining the routine of controlling relative positions of light beams in the third embodiment.

How the relative position of a beam is controlled in the third embodiment will be described with reference to the flowchart of FIG. 13.

The CPU 51 of the system shown in FIG. 12 controls the intensity of each beam in a beam-intensity control routine (ST1). This control renders a fixed beam and a movable beam identical in terms of intensity.

Figure 14:
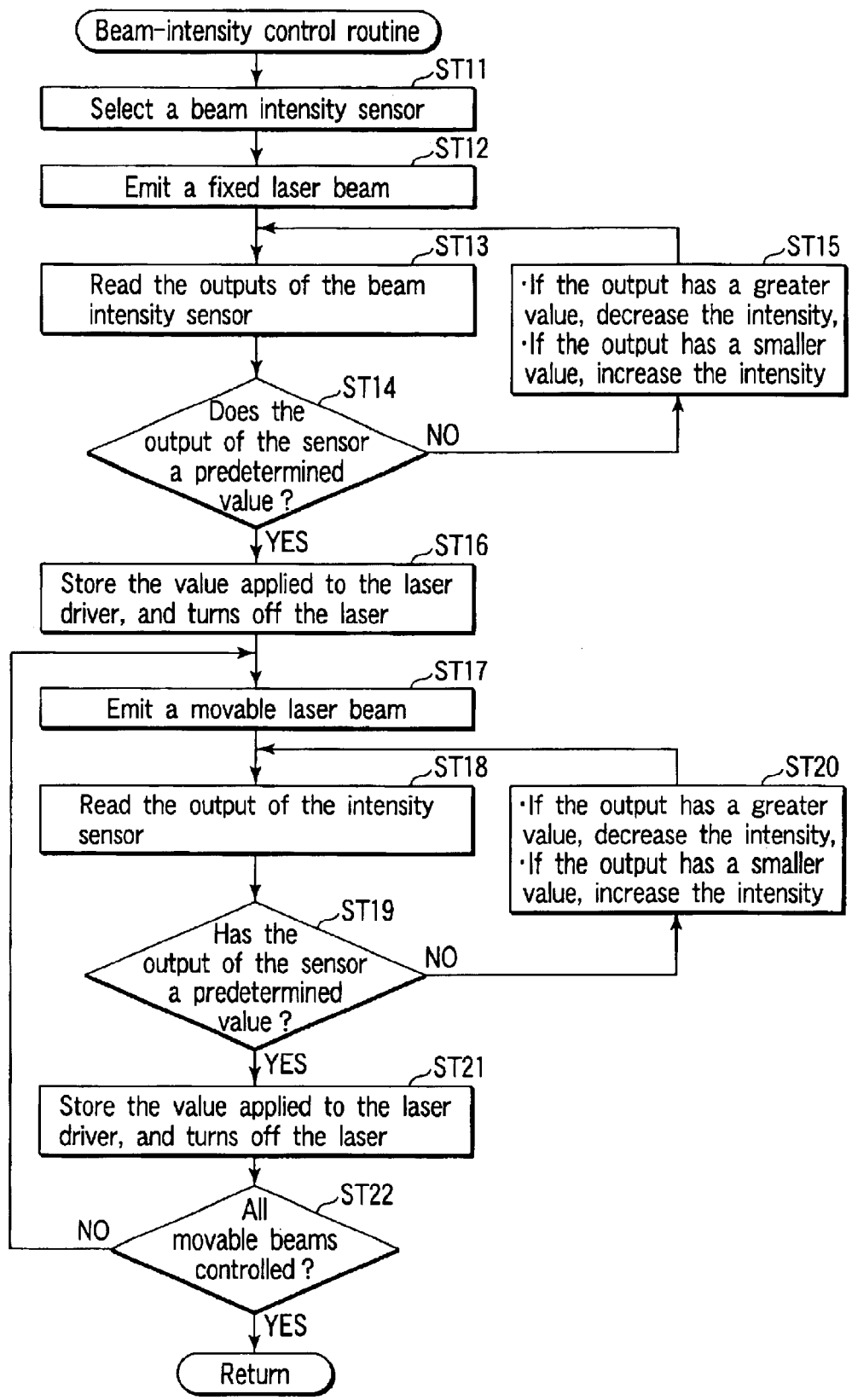
FIG. 14 is a flowchart explaining the routine of controlling the intensity of light beams.

FIG. 14 illustrates the beam-intensity control routine in detail.

First, the CPU 51 selects a beam intensity sensor (ST11). More specifically, the CPU 51 outputs a sensor-selecting signal to the analog multiplexer 73 so that the output of the adder 86 may be supplied to the integrator 74. The integration-reset signal selecting circuit 80 selects the integration reset signal generated from the outputs of the timing sensors SA and SB. At the same time, the conversion-starting signal selecting circuit 81 selects the output of the timing sensor SR as a conversion-starting signal. In this control, the relative position sensors SO and SP are regarded as a single light-receiving part and are used as beam intensity sensor. Namely, the light-receipting parts SP and SO are considered as one rectangular light-receiving part, though they are shaped like a sawtooth, and used as beam intensity sensor.

Next, the CPU 51 causes the laser driver 32a to drive the laser 31a. When driven, the laser 31a emits a fixed beam that has a predetermined intensity (ST12).

The fixed beam thus emitted is applied to the sensor (beam-detecting section 38) by the polygon mirror 35 that is rotating.

As the scanning beam moves, each sensor generates an output.

When the beam passes through the timing sensors SA and SB, an integration reset signal is generated. This signal resets the integrator 74.

When the beam travels over the relative position sensors SO and SP, the sensors SO and SP generate currents, each corresponding to the intensity of the beam. The I/V converter O converts the output current of the sensor SO to a voltage, and the I/V converter P converts the output current of the sensor SP to a voltage. The adder 86 adds the voltages.

The output of the adder 86 is supplied via the analog multiplexer 73 to the integrator 74. The integrator 74 integrates the output of the adder 86. The A/D converter 75 converts the output of the integrator 74 to an analog signal, at the leading edge of the SR output generated when the scanning beam passes through the timing sensor SR. The SR output is input to the CPU 51 as a conversion-terminating signal. The CPU 51 receives the output of the A/D converter 75 at the trailing edge of the SR output (ST13).

Then, the CPU 51 determines whether the data output from the A/D converter 75 (i.e., the intensity of the beam) has a predetermined value or not (ST14).

The data may have a value greater than the predetermined one (if the beam is more intense than prescribed). In this case, the CPU 51 causes the laser driver 32a to increase the intensity of the laser beam (ST15).

If the data is found, in Step ST14, to have the predetermined value, the CPU 51 stores the value applied to the laser driver 32a. This done, the CPU 51 turns off the laser 31a in order to control the intensity of a movable beam that is to be applied in the next step (ST16).

The CPU 51 causes the laser driver 32b to drive the laser 31b. When driven, the laser 31b emits a movable beam of a predetermined intensity (ST17).

Steps ST18 to ST21 are identical to Steps ST13 to ST16, respectively, and will not be described.

The CPU 51 causes the laser driver 32c to drive the laser 31c. When driven, the laser 31c emits a movable beam of a prescribed intensity (ST17). Subsequently, Steps ST18 to ST21 are controlled.

Finally, the CPU 51 causes the laser driver 32d to drive the laser 31d. When driven, the laser 31d emits a movable beam of a prescribed intensity (ST17). Then, Steps ST18 to ST21 are controlled.

After all movable beams (emitted from the lasers 31b to 31d) are controlled in terms of intensity (ST22), the CPU 51 terminates the beam-intensity control routine.

Next, the CPU 51 executes a reference-pitch measuring routine (ST2).

Figure 15:
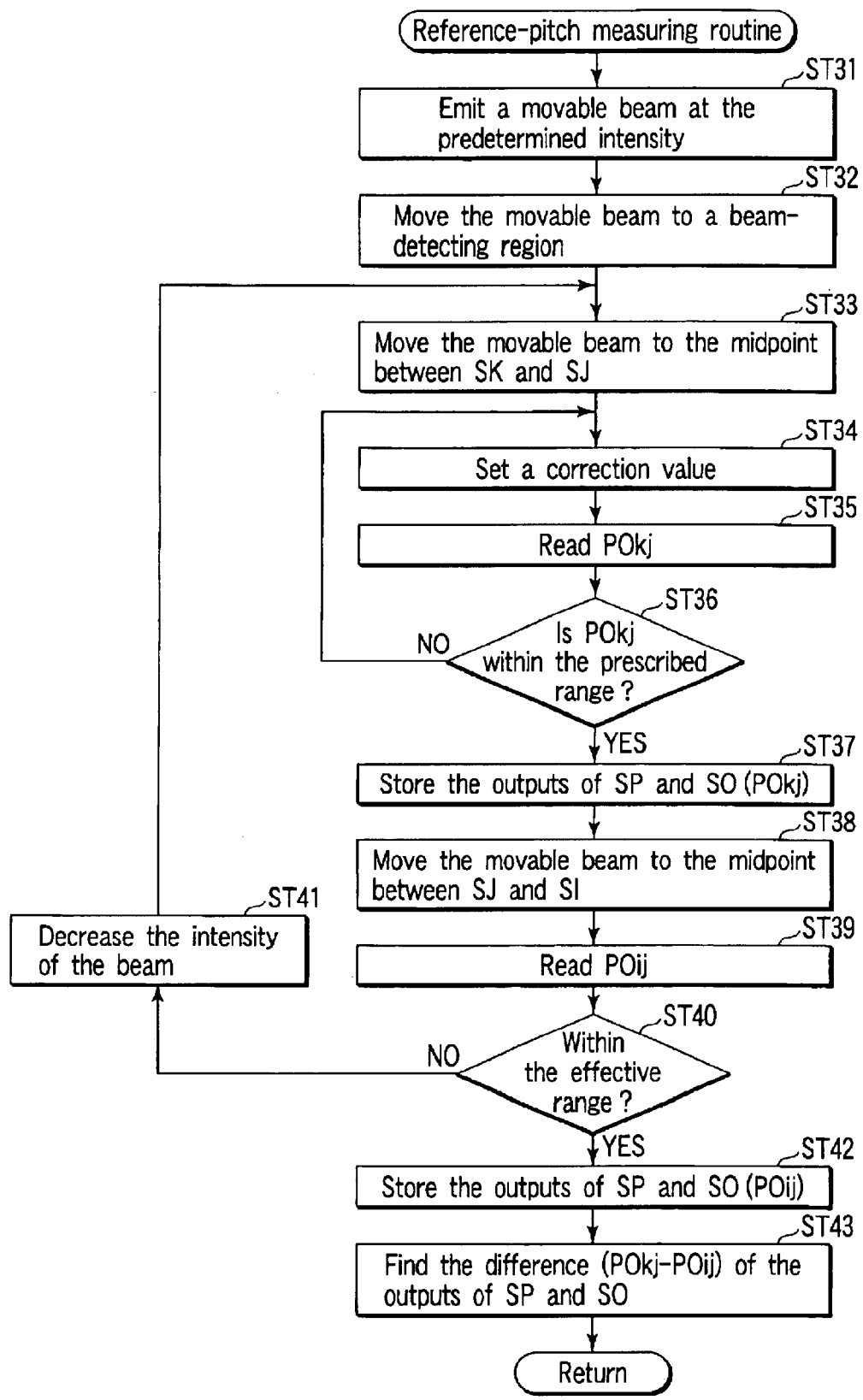
FIG. 15 is a flowchart explaining the routine of measuring the reference pitch in the third embodiment.

FIG. 15 shows the reference-pitch measuring routine in detail.

First, the CPU 51 causes the laser driver 32b to drive the laser 31b. When driven, the laser 31b emits a movable beam that has a predetermined intensity (ST31). More precisely, the laser driver 32b drives the laser 31b at the value obtained in the preceding routine, i.e., the beam-intensity control routine. In Step ST31, the laser driver 32b and the laser 31b are used. Instead, the laser driver 32c and laser 32c, or the laser driver 32d and laser 32d may be used.

Then, the CPU 51 drives the galvano mirror 33b, or beam actuator. Thus driven, the mirror 33b moves the movable beam emitted from the laser 31b, to a sensor detection region (ST32). Further, the movable beam is moved to the midpoint between the reference pitch sensors SK and SJ (ST33).

The CPU 51 sets a correction value into the relative position sensors SO and SP, while maintaining the value applied to the galvano mirror 33b at this time (ST34). Then, the CPU 51 reads the outputs (POkj) of the relative position sensors SO and SP (ST35). If the outputs have values falling within a prescribed range (ST36), the CPU 51 stores the outputs (POkj) that the relative position sensors SO and SP generate at this time (ST37).

If the outputs are found, in Step ST36, to fall outside the prescribed range, the SPU 51 set a different correction value into relative position sensors SO and SP (ST34). The CPU 51 again reads outputs (POkj) of the relative position sensors SO and SP (ST35). The CPU 51 determines whether the outputs POkj fall within the prescribed range (ST36).

The CPU 51 repeats Steps ST34 to ST36 until the outputs (POkj) come to fall within the prescribed range and stores the final outputs (POkj) of the relative position sensors SO and SP (ST37). In the above-mentioned steps, an appropriate correction graph is selected.

Then, the CPU 51 performs a control, moving the movable beam emitted from the laser 31b to the midpoint between the reference pitch sensors SJ and SI (Step S38). When the movable beam is set at the midpoint, the CPU 51 reads the outputs (POkj) of the relative position sensors SO and SP, while holding the value applied to the galvano mirror 33b (ST39). The CPU 51 determines whether the outputs have values that fall within an effective range (ST40). To be more specific, the CPU 51 determines whether they are greater than the lower limit VI.

If the outputs fall within the effective range, the CPU 51 stores the outputs (POkj) of the relative position sensors SO and SP (ST42).

If the outputs are found, in Step S40, to fall outside the effective range (if they are equal to or less than VI), the CPU 51 decreases the intensity of the beam (ST41) and repeats Steps ST33 to ST40 again. The CPU 51 repeats Steps ST33 to ST41 until the outputs (POkj) of the relative position sensors SO and SP fall into the effective range. That is, the CPU 51 decreases the intensity of the beam, reducing the slope of the correction graph and, hence, adjusting the reference pitch to a value within the effective range.

Finally, the CPU 51 calculates the difference (POkj–POij) between the outputs of the relative position sensors SO and SP (ST43) and finds the outputs of the sensors SO and SP that correspond to the reference pitch.

Upon finishing the reference-pitch measuring routine, the CPU 51 controls the intensity of the movable beam gain (ST3). The CPU 51 performs this control because the movable beam has its intensity decreased in the preceding step. More correctly, it increases the intensity of the movable beam to the same value as the fixed beam. Namely, it renders the intensity of the movable beam equal to that of the fixed beam.

Then, the CPU 51 causes the relative position sensors SO and SP to detect the position where the fixed beam passes, as in the conventional beam-passing position sensor (ST4). Then, the CPU 51 controls the movable beam, positioning it at a desirable pitch (ST5).

With the third embodiment it is possible to detect the beam-passing position accurately and to control the pitch between the beams, even if the photodiodes constituting the sensors have each a sensitivity different from the design value (a higher sensitivity than desired) and the circuits used have different circuit constants.

The fourth embodiment of this invention will be described.

Figure 16:
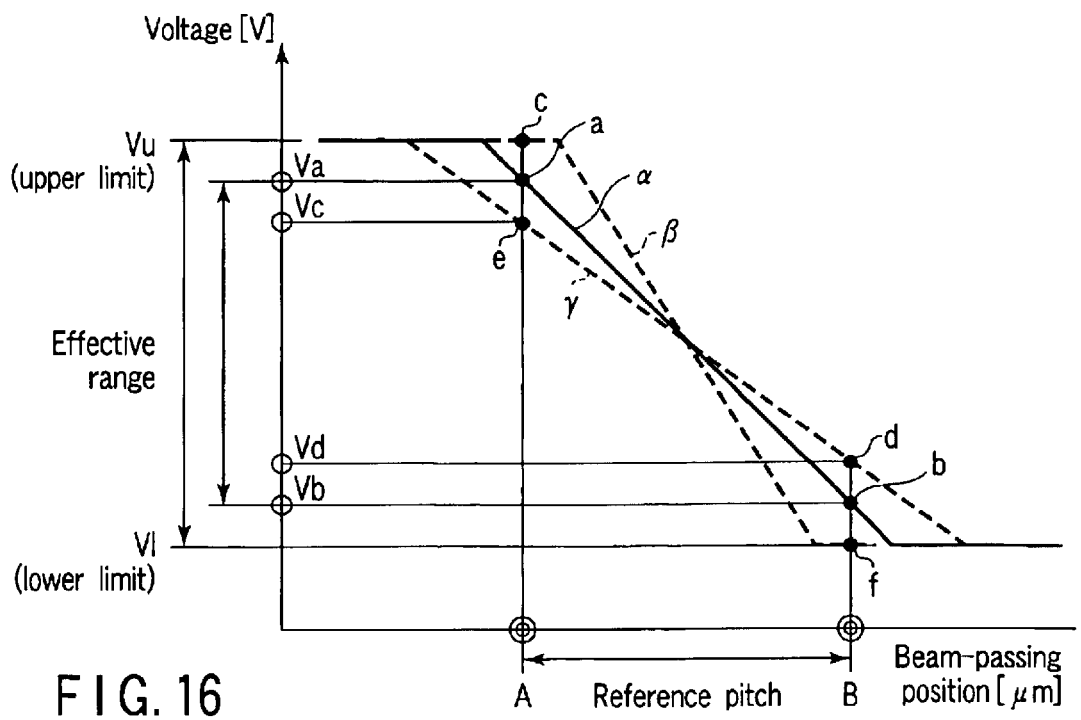
FIG. 16 is a diagram explaining the output of the relative position sensor.

The beam may have intensity smaller than the predetermined value. If so, the slope γ shown in FIG. 16 holds true. That is, the slope (sensitivity) in the graph is less steep than the slope α. In this case, the relative position sensor outputs e(Vc) when the beam-passing position is adjusted to position A. This voltage level Vc falls within the effective range, the output of the relative position sensor is stored.

The CPU 51 controls the position of the movable beam, to the midpoint (i.e., position B) between the reference pitch sensors SJ and SI. While holding the beam-passing position, the CPU 51 reads the outputs of the relative position sensors SO and SP. The outputs of the relative position detectors are d(Vd). The voltage Vd falls within the effective range, too. The outputs that the relative position sensors generate at this time are, therefore, stored. The CPU 51 then calculates the output of the relative position sensor, which represents the reference pitch. The output is: (Vc–Vd)/(A–B).

In the case described above, however, the slope showing the output of each relative position sensor is less steep than the slope showing the design value. The voltage for the unit length (i.e., 1 μm in the embodiment) is therefore small. Namely, the sensitivity of detecting the beam-passing position decreases. If the sensitivity decreases, the precision of controlling the beam will decreases, too. Consequently, the image output may have pitch error (that is, its quality may decrease).

This problem may arise, too, if the photodiodes constituting the sensors have sensitivity different from the design value (sensitivity lower than desired value) and the circuits used have different circuit constants. For example, if the photodiode have sensitivity different from the desired value (sensitivity lower than the desired value), they will generate but a small current even if they are irradiated with a laser beam of the predetermined intensity. As a consequence, the slope representing the characteristic of the relative position sensors is small. The slop is equivalent to "γ" in the graph shown in FIG. 16.

As for the circuit constants, a similar problem will arise if the I/V converters have a low resistance each, if the differential amplifiers have a small gain each and if the integrator has a large integration constant (that is, if it has low sensitivity because its constant greatly depending on the resistor and capacitor constituting the integrator).

In the fourth embodiment, the above-mentioned problem can be solved by increasing the intensity of the laser beam.

In the fourth embodiment, the routine of controlling the relative positions of light beams proceeds in the same way as in the third embodiment. The flowchart of FIG. 13 shows the basic configuration of the fourth embodiment. Therefore, the basic configuration will not described here. The fourth embodiment differs from the third embodiment in the reference-pitch measuring routine.

Figure 17:
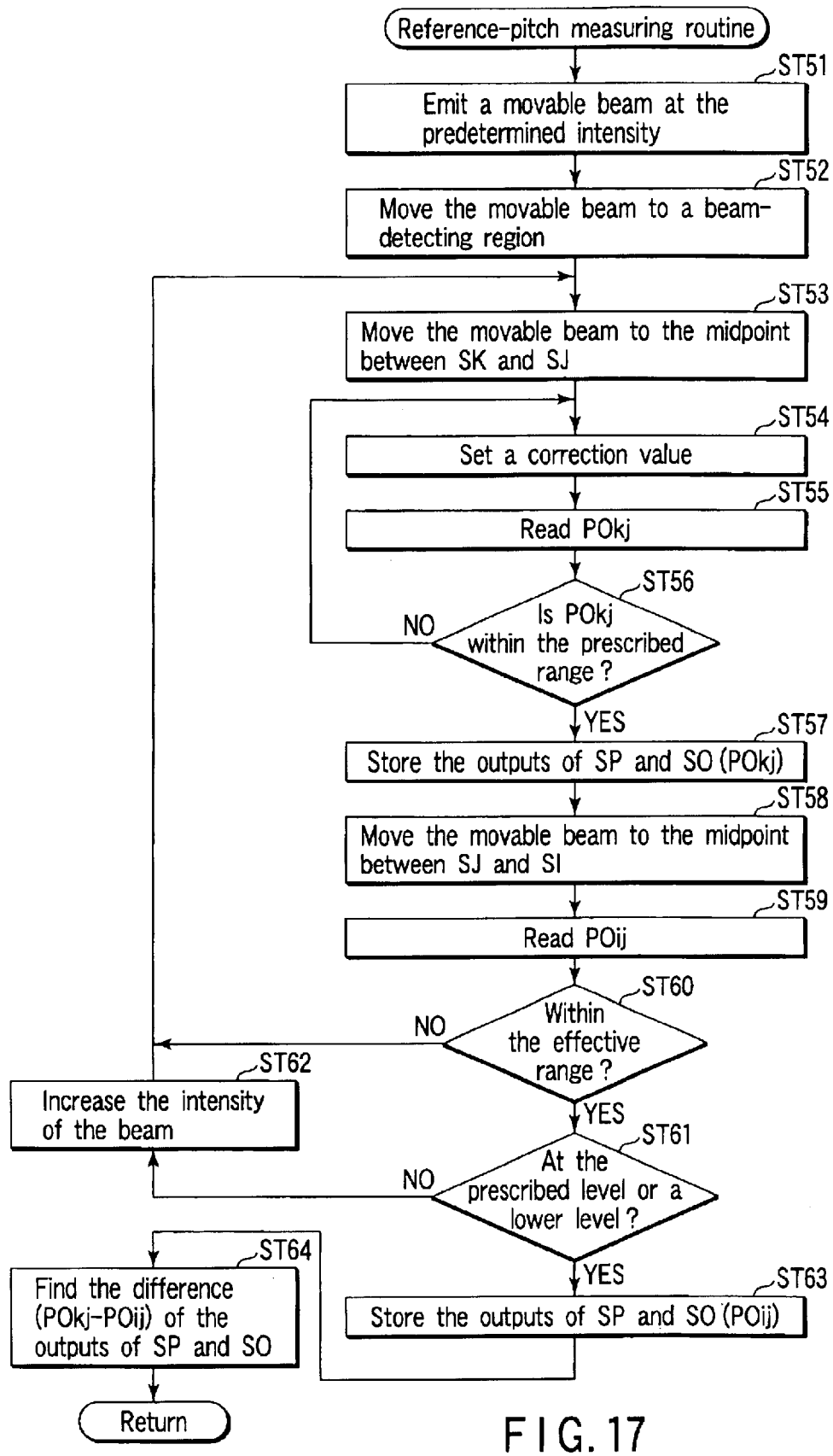
FIG. 17 is a flowchart explaining the routine of measuring the reference pitch in the fourth embodiment of the invention.

How the reference-pitch measuring routine is carried out in the fourth embodiment will be described, with reference to the flowchart of FIG. 17.

First, the CPU 51 causes the laser driver 32b to drive the laser 31b. When driven, the laser 31b emits a movable beam that has a predetermined intensity (ST51). More precisely, the laser driver 32b drives the laser 31b at the value obtained in the preceding routine, i.e., the beam-intensity control routine. In Step ST51, the laser driver 32b and the laser 31b are used. Nonetheless, the laser driver 32c and laser 32c, or the laser driver 32d and laser 32d may be used.

Then, the CPU 51 drives the galvano mirror 33b, or beam actuator. Thus driven, the mirror 33b moves the movable beam emitted from the laser 31b, to a sensor detection region (ST52). Further, the movable beam is moved to the midpoint between the reference pitch sensors SK and SJ (ST53). The midpoint is the position A illustrated in FIG. 16.

The CPU 51 sets a correction value into the relative position sensors SO and SP, while maintaining the value applied to the galvano mirror 33b at this time (ST54). Then, the CPU 51 reads the outputs (POkj) of the relative position sensors SO and SP (ST55). If the outputs have values falling within a prescribed range (ST56), the CPU 51 stores the outputs (POkj) that the relative position sensors SO and SP generate at this time (ST57).

If the outputs are found, in Step ST56, to fall outside the prescribed range, the SPU 51 set a different correction value into relative position sensors SO and SP (ST54). The CPU 51 again reads outputs (POkj) of the relative position sensors SO and SP (ST55). The CPU 51 determines whether the outputs POkj fall within the prescribed range (ST56).

The CPU 51 repeats Steps ST54 to ST56 until the outputs (POkj) come to fall within the prescribed range and stores the final outputs (POkj) of the relative position sensors SO and SP (ST57). In the case shown in FIG. 16, the output that the sensor finally generates is e(Vc).

Then, the CPU 51 performs a control, moving the movable beam emitted from the laser 31b to the midpoint between the reference pitch sensors SJ and SI (Step S58). The midpoint is equivalent to the position B shown in FIG. 16.

When the movable beam is set at the midpoint, the CPU 51 reads the outputs (POkj) of the relative position sensors SO and SP, while holding the value applied to the galvano mirror 33b (ST59). The CPU 51 determines whether the outputs have values that fall within an effective range (ST60). To be more specific, the CPU 51 determines whether they are greater than the lower limit VI.

If it is found in Step S60 that the outputs fall within the effective range, the CPU 51 performs Step S61.

The outputs fall outside the effective range. (That is, it may be equal to or smaller than VI.) In this case, the sets a correction value for the relative position sensors again and repeats Steps ST53 to ST60 until the values of POjk and POij fall within the effective range.

When both POjk and POij fall within the effective range (ST60), the CPU 51 determines whether the output level (voltage) of POij is equal to or lower than a predetermined value (ST61).

If the slope showing the output of each relative position sensor is small (not so steep), POij is controlled to have a level within a specific range. In this case, POij has an output level higher than the design level.

The CPU 51 determines whether the slope is gentle or not, from the level of POij (ST61). If the slop is gentle (that is, if POij has a level higher than the predetermined one), CPU 51 increases the intensity of the laser beam (ST62). When the intensity of the laser beam is increased, the slope showing the output of each relative position sensor increase (becomes steep).

Then, the CPU 51 repeats Steps ST53 to ST61 until both POjk and POij fall within a prescribed range.

If POij is found, in Step ST61, to have a level equal to or lower than the predetermined one, the CPU 51 stores the outputs (POij) of the relative position sensors SO and SP (ST63).

The CPU 51 calculates the difference (POkj–POij) between the output POjk of the relative position sensor SO and the output POij of the relative position sensor SP (ST64). The CPU 51 also finds the outputs of the relative position sensors SO and SP, which correspond to the reference pitch.

As indicated above, the fourth embodiment can detect the beam-passing position with high accuracy, even if the sensitivity (slope) of each relative position sensor falls below the design value because the photodiode constituting the sensor has sensitivity different from the design value (lower than desired) or because the circuits used have different circuit constants. The beams can therefore be positioned at the predetermined pitch.

Thus, the fourth embodiment can solve the problem that the light beam has intensity different from the prescribed value and the photodiodes constituting the sensors have sensitivity different from the design value, or the circuits used have different circuit constants. The sensors can, therefore, attain predetermined sensitivity and detect the beam-passing position accurately. This enhances the precision of beam control, causing no pitch errors in the output image. The image is improved in quality.

The fifth embodiment will be described below.

The third and fourth embodiments can solve the problem that the image quality is degraded due to insufficient control of the beam-passing position or the beam-pitch errors. However, they cannot impart a sufficiently high sensitivity to the sensors. In the fifth embodiment, the relative position sensors can acquire a desired output characteristic. This enhances the detection precision as much as desired and achieves the high-precision control of beams. As a result, the fifth embodiment can output high-quality images that are free of pitch errors.

The routine of controlling the relative positions of light beams proceeds in the same way as in the third and fourth embodiments. The basic configuration of the fifth embodiment is shown in the flowchart of FIG. 13 and will not be described. The fifth embodiment differs from the fourth embodiment in respect of the reference-pitch control routine.

Figure 18:
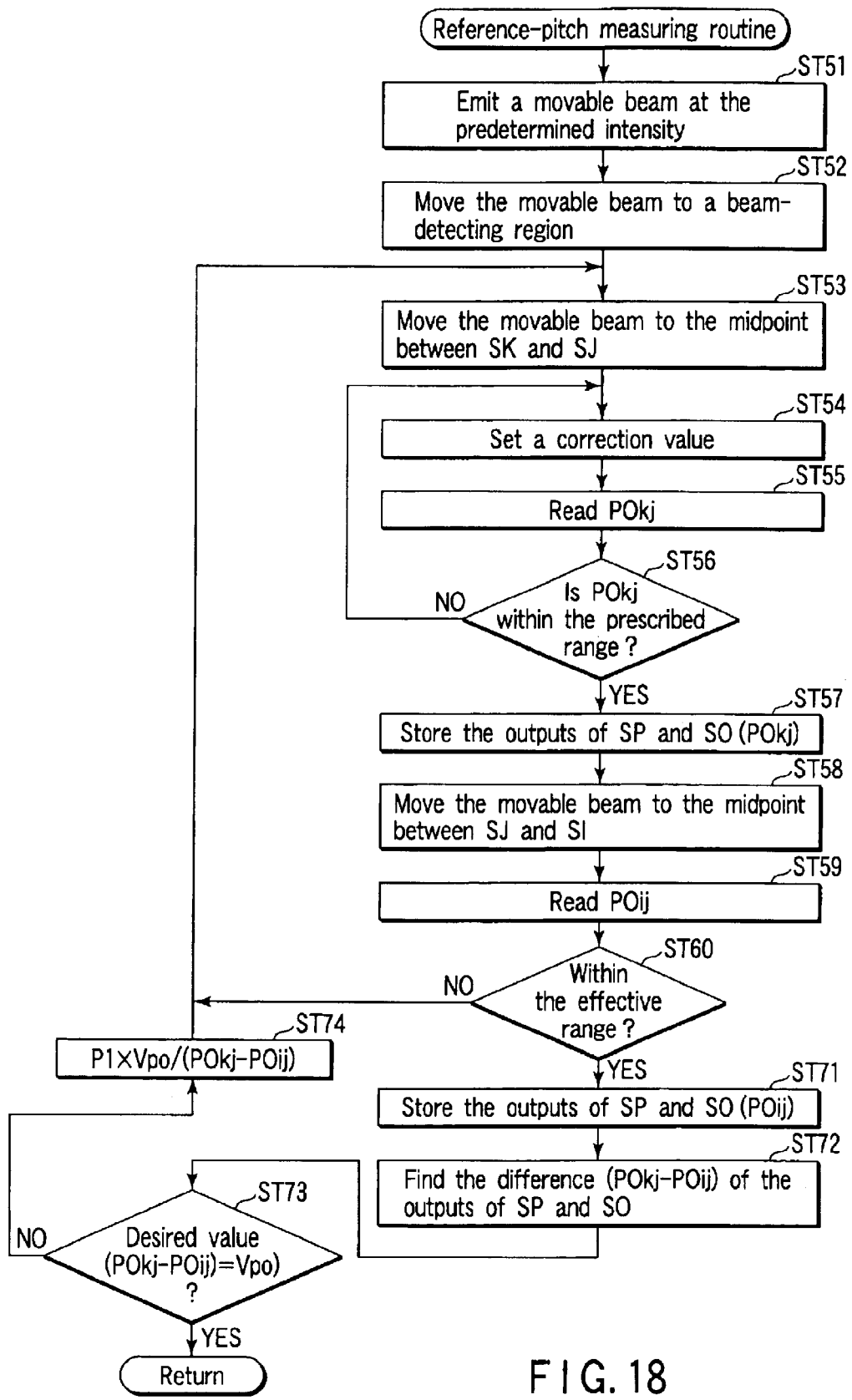
FIG. 18 is a flowchart explaining the routine of measuring the reference pitch in the fifth embodiment of the invention.

How the reference-pitch control routine is carried out in the fifth embodiment will be explained, with reference to the flowchart of FIG. 18.

Steps ST51 to ST60, in which POkj and POij are controlled to fall into the effective range, are identical to those carried out in the fourth embodiment. They will not be described here.

Once POkj and POij have fallen into the effective range, the CPU 51 stores the outputs (Poij) of the relative position sensors SO and SP (ST71). The finds the difference (Pokj–POij) between the last outputs that the relative position sensors SO and SP have generated (ST72).

After calculating the difference in Step ST72, the CPU 51 determines whether the difference is a desired value "Vpo" (ST73). The desired value "Vpo" can be freely set within an effective range. It is set at Va–Vb, for example, because it is usually desired that the sensors should have high sensitivity. Va and Vb are design sensitivity α show in FIG. 18.

If the difference, POkj–POij, is not equal to Vpo, the CPU 51 performs the following calculation, adjusting the intensity of the laser beam (emitted from the laser 31b) (ST74). Then, the operation returns to Step ST53, in which the reference pitch is measured again.

$$Beam\ intensity = P1 \times Vpo/(Pokj-POij)$$

Thus, the ratio of the sensor output calculated to the desired output (voltage) is obtained, and the intensity of the laser beam is adjusted in accordance with the ratio obtained. That is, if the sensor output is half (½) the desired voltage "Vpo," the beam intensity is set twice as much, and the laser beam is controlled again. If the sensor output is twice the desired value, the beam intensity is set half (½) the initial value, and the laser beam is controlled again.

If the difference is a desired value is found to be desired one, in Step ST73, the CPU 51 terminates the reference-pitch measuring routine.

In the fifth embodiment described above, the sensors can acquire desired sensitivity even if the light beam has intensity different from the design value, the photodiodes differ in sensitivity or the circuits used have different constants. The fifth embodiment can therefore detect the beam-passing position with desired (high) precision and can control the beam with high accuracy.

In an image forming apparatus having such a configuration, the sensors can attain desired sensitivity even if the light beam has intensity different from the design value, the photodiodes differ in sensitivity or the circuits used have different constants. The apparatus can therefore detect the beam-passing position with desired (high) precision and can control the beam with high accuracy. The apparatus can form high-quality images free of pitch errors.

As has been explained, the beam-passing position sensors do not make errors, serving to change the beam-passing position to a desired position, in the above-described embodiments of this invention. The embodiments can therefore provide an image forming apparatus that can form images of high quality.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A light-beam scanning apparatus for scanning a surface with a light beam, comprising:

a light-emitting unit which emits a light beam;

a scanning unit which scans the surface with the light beam emitted from the light-emitting unit, in a main scanning direction;

a first beam-detecting unit which is provided on the surface or at a position equivalent to the surface and which converts the light beam to an electric signal at a first position in the main scanning direction;

a second beam-detecting unit which is provided on the surface or at a position equivalent to the surface and which converts the light beam to an electric signal at a second position in the main scanning direction, the second position being downstream the first beam-detecting unit;

a third beam-detecting unit which is provided on the surface or at a position equivalent to the surface, which has a length different from that of the first beam-scanning unit in a sub-scanning direction and which converts the light beam to an electric signal at a third position in the main scanning direction, the third position being downstream the second beam-detecting unit; and control unit which reads beam information from the second beam-detecting unit at the time the first and third beam-detecting units detect the light beam and controls a position where the light beam passes or intensity of the light beam.

2. The light-beam scanning apparatus according to claim 1, wherein the first beam-detecting unit scans the surface in the sub-scanning direction over a distance longer than the third beam-detecting scans the surface.

3. The light-beam scanning apparatus according to claim 1, wherein the second beam-detecting unit outputs beam-passing position information.

4. The light-beam scanning apparatus according to claim 1, wherein the second beam-detecting unit outputs beam-intensity information.

5. The light-beam scanning apparatus according to claim 1, wherein the third beam-detecting unit scans the surface in the sub-scanning direction over a distance longer than the first beam-detecting scans the surface.

6. The light-beam scanning apparatus according to claim 1, wherein the control unit has a first information-processing section which processes the beam information output from the second beam-detecting unit and a first determining section which determines the beam-passing position from the information processed by the first information-processing section.

7. The light-beam scanning apparatus according to claim 1, wherein the control unit has a second information-processing section which processes the beam information output from the second beam-detecting unit and a second determining section which determines the intensity of the light beam from the information processed by the second information-processing section.

8. An image forming apparatus for forming an image on an image-forming medium, comprising:

a light-emitting unit which emits a light beam;

an image-carrying body on which a latent image is formed by using the light beam emitted from the light-emitting unit;

a scanning unit which scans the surface with the light beam emitted from the light-emitting unit, in a main scanning direction;

a first beam-detecting unit which is provided on the surface or at a position equivalent to the surface and which converts the light beam to an electric signal at a first position in the main scanning direction;

a second beam-detecting unit which is provided on the surface or at a position equivalent to the surface and which converts the light beam to an electric signal at a second position in the main scanning direction, the second position being downstream the first beam-detecting unit;

a third beam-detecting unit which is provided on the surface or at a position equivalent to the surface, which has a length different from that of the first beam-detecting unit in a sub-scanning direction and which converts the light beam to an electric signal at a third position in the main scanning direction, the third position being downstream the second beam-detecting unit;

control unit which reads beam information from the second beam-detecting unit at the time the first and third beam-detecting units detect the light beam and controls a position where the light beam passes and intensity of the light beam; and an image-forming unit which causes the scanning unit to scan the surface of the image-carrying body with the light beam from the light-emitting unit when the control unit finishes controlling the position and intensity of the light beam, thereby forming an latent image, and which converts the latent image to a visible image and transfers the visible image onto the image-forming medium.

* * * * *